United States Patent
Yamada et al.

(10) Patent No.: US 8,736,880 B2
(45) Date of Patent: May 27, 2014

(54) IMAGE FORMING SYSTEM, IMAGE FORMING APPARATUS, AND NON-TRANSITORY COMPUTER READABLE MEDIUM WHICH IS A TRANSMISSION DESTINATION OF IMAGE DATA

(75) Inventors: Jyunya Yamada, Kanagawa (JP); Makoto Nishimura, Tokyo (JP); Kazuaki Ozawa, Tokyo (JP); Masahiro Oishi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 134 days.

(21) Appl. No.: 13/440,688

(22) Filed: Apr. 5, 2012

(65) Prior Publication Data
US 2013/0094051 A1    Apr. 18, 2013

(30) Foreign Application Priority Data

Oct. 14, 2011 (JP) ................. 2011-226741

(51) Int. Cl.
*G06F 3/12* (2006.01)
*G06K 15/00* (2006.01)

(52) U.S. Cl.
USPC ........................... 358/1.15; 358/1.16

(58) Field of Classification Search
USPC ............. 358/1.1, 1.13, 1.14, 1.15, 1.18, 402, 358/1.16; 709/201, 203, 217, 219, 220; 707/500, 526; 399/8; 345/112, 326
See application file for complete search history.

(56) References Cited

U.S. PATENT DOCUMENTS

| | | | | |
|---|---|---|---|---|
| 5,668,936 A | * | 9/1997 | Motooka et al. | 358/1.15 |
| 6,348,972 B1 | * | 2/2002 | Taniguchi et al. | 358/1.15 |
| 8,542,370 B2 | * | 9/2013 | Ikeura | 358/1.13 |

FOREIGN PATENT DOCUMENTS

JP    A-2009-64197    3/2009

* cited by examiner

*Primary Examiner* — Gabriel Garcia
(74) *Attorney, Agent, or Firm* — Oliff PLC

(57) ABSTRACT

An image forming system includes an image forming apparatus, a transmission apparatus, a reception section that is provided in the image forming apparatus and receives a designation of the transmission apparatus, a first transmission section that is provided in the image forming apparatus and transmits apparatus information indicating the own apparatus to a transmission apparatus designated in the reception section, a first storage unit that is provided in the transmission apparatus and stores the apparatus information transmitted from the first transmission section, a second transmission section that is provided in the transmission apparatus and transmits image data to an image forming apparatus indicated by the apparatus information stored in the first storage section, and an image forming unit that is provided in the image forming apparatus and forms an image corresponding to the image data transmitted from the second transmission section.

14 Claims, 23 Drawing Sheets

FIG. 4

| USER ID | PASSWORD |
|---------|----------|
| user001 | 1234 |
| user002 | 5678 |
| ... | ... |

— 41

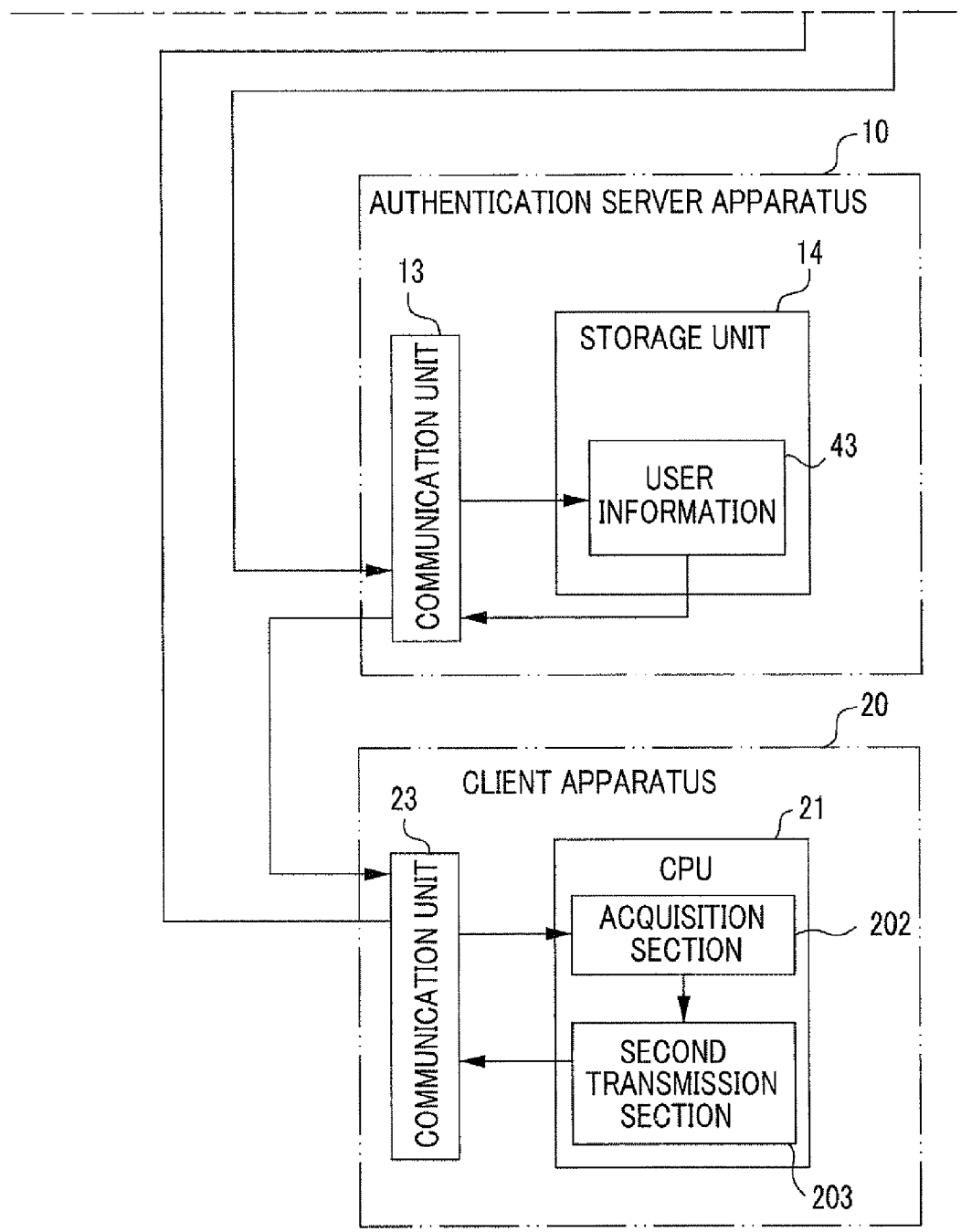
(FIG. 13 Continued)

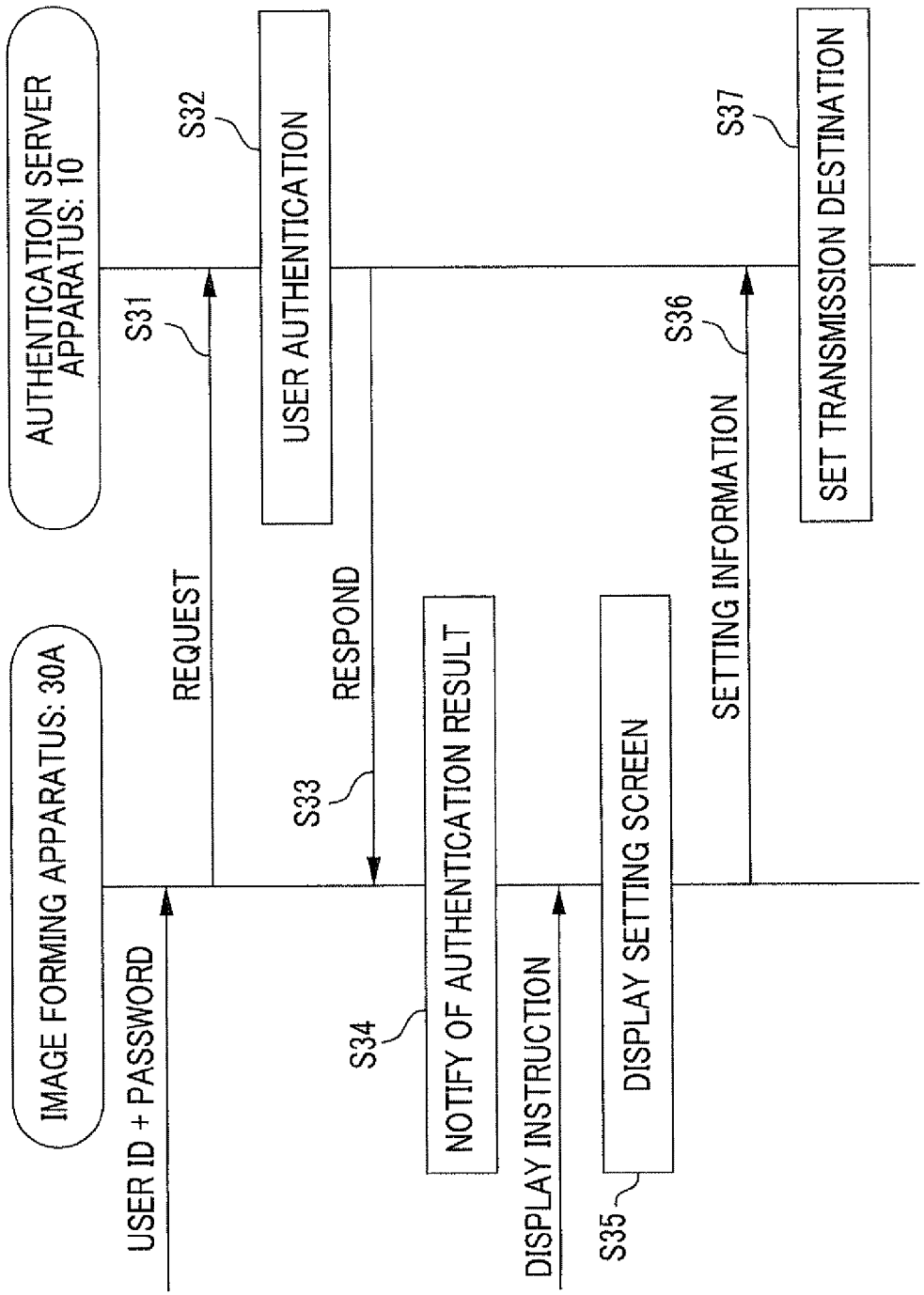

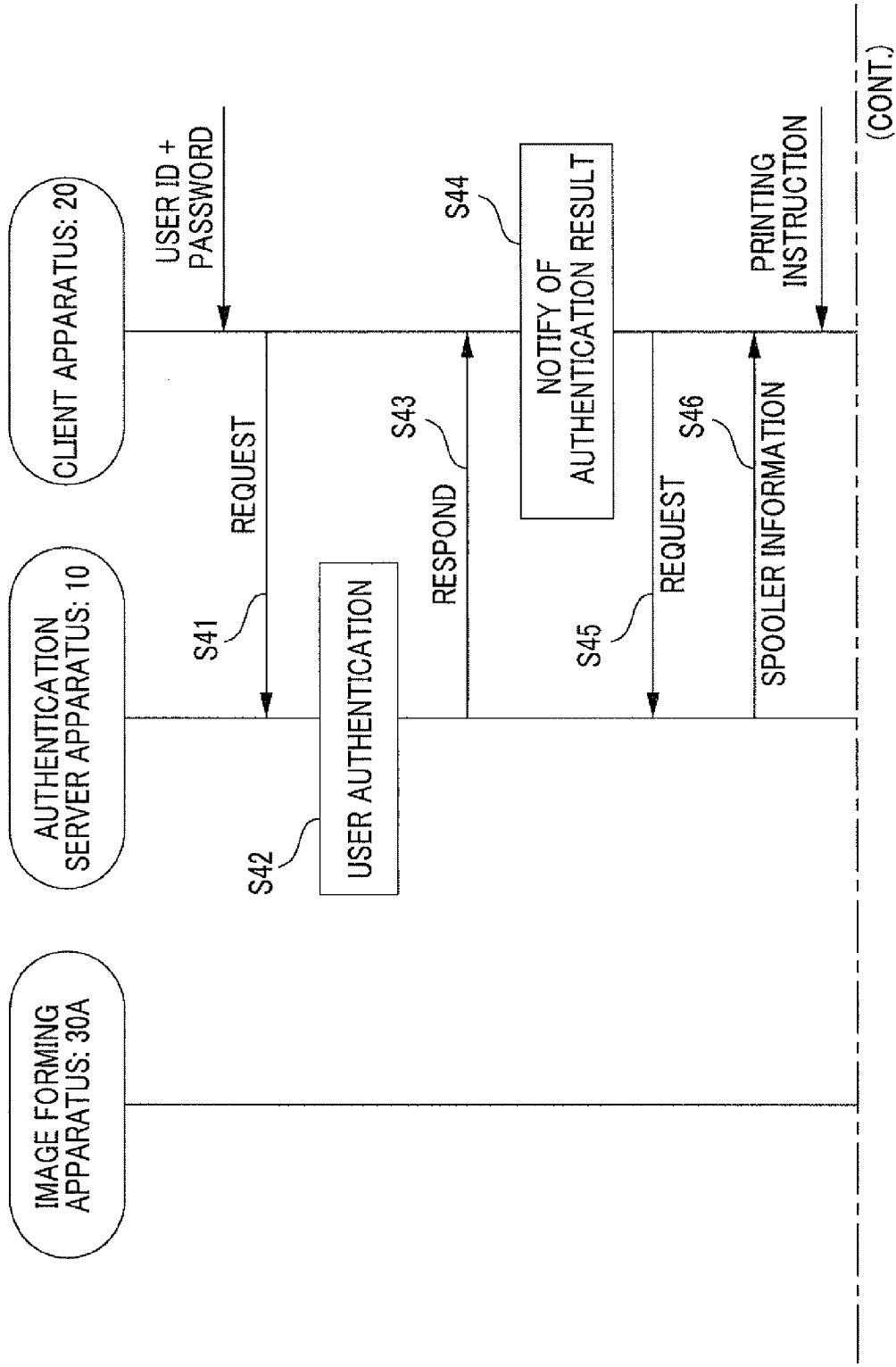

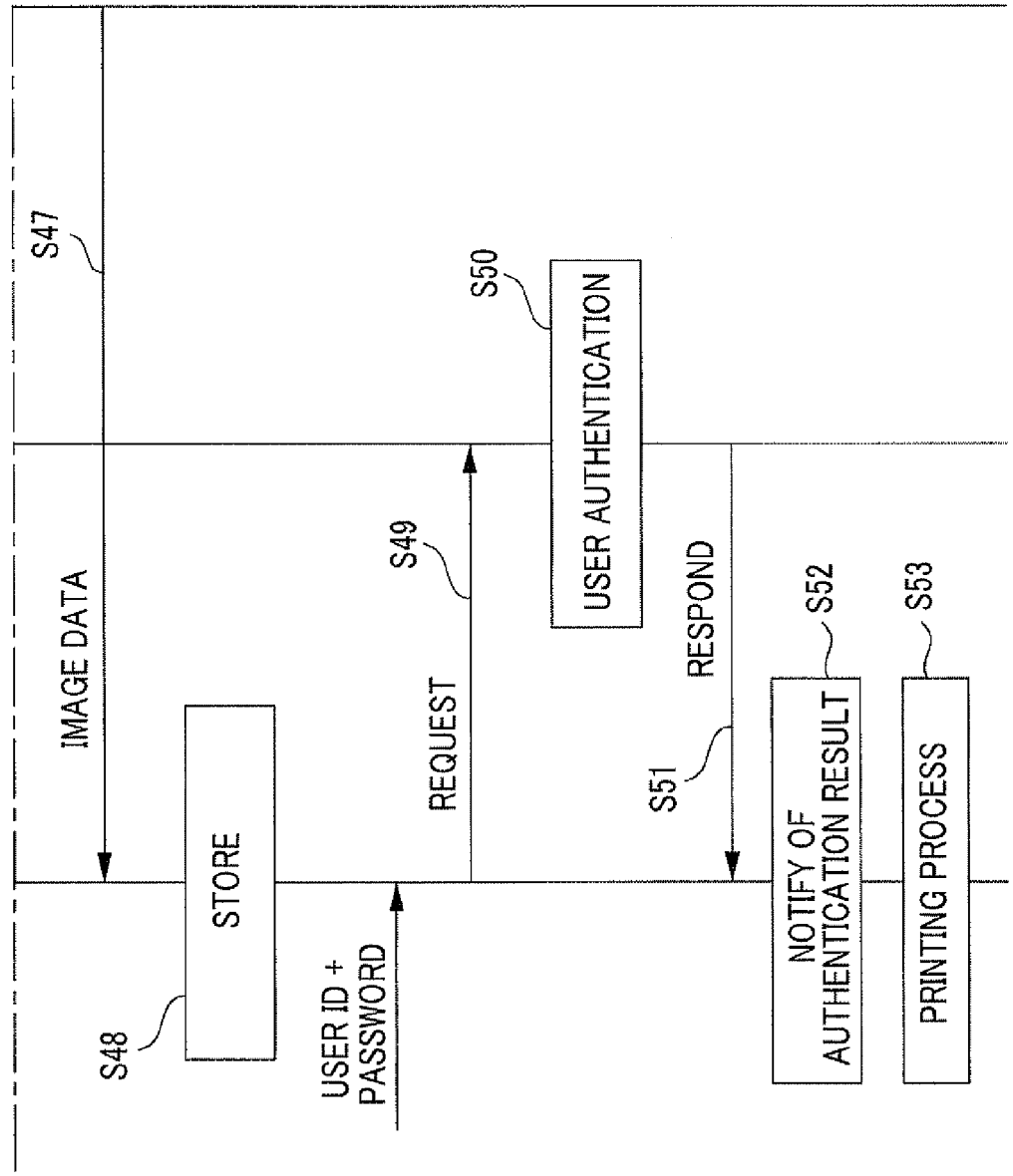

FIG. 19

| USER ID | PASSWORD | PRIMARY SPOOLER INFORMATION | SECONDARY SPOOLER INFORMATION |
|---|---|---|---|
| user001 | 1234 | spoolerA | spoolerC |
| user002 | 5678 | ... | ... |
| ... | ... | ... | ... |

43A

IMAGE FORMING SYSTEM, IMAGE FORMING APPARATUS, AND NON-TRANSITORY COMPUTER READABLE MEDIUM WHICH IS A TRANSMISSION DESTINATION OF IMAGE DATA

CROSS-REFERENCE TO RELATED APPLICATIONS

This application is based on and claims priority under 35 USC 119 from Japanese Patent Application No. 2011-226741 filed Oct. 14, 2011.

BACKGROUND (i) Technical Field

The present invention relates to an image forming system, an image forming apparatus, and a non-transitory computer readable medium.

(ii) Related Art

There are cases where plural image forming apparatuses are connected to a client apparatus. In this case, it is necessary for the client apparatus to set an image forming apparatus which is a transmission destination of image data.

SUMMARY

According to an aspect of the invention, there is provided an image forming system including an image forming apparatus, a transmission apparatus, a reception section that is provided in the image forming apparatus and receives a designation of the transmission apparatus, a first transmission section that is provided in the image forming apparatus and transmits apparatus information indicating the own apparatus to a transmission apparatus designated in the reception section, a first storage unit that is provided in the transmission apparatus and stores the apparatus information transmitted from the first transmission section, a second transmission section that is provided in the transmission apparatus and transmits image data to an image forming apparatus indicated by the apparatus information stored in the first storage section, and an image forming unit that is provided in the image forming apparatus and forms an image corresponding to the image data transmitted from the second transmission section.

BRIEF DESCRIPTION OF THE DRAWINGS

Exemplary embodiments of the present invention will be described in detail based on the following figures, wherein:

FIG. 4 is a diagram illustrating an example of the authentication information;

FIG. 14 is a sequence chart illustrating a setting operation of the second exemplary embodiment;

FIG. 17 is a sequence chart illustrating a printing operation according to the second exemplary embodiment;

FIG. 19 is a diagram illustrating an example of the user information according to the modified example 2;

DETAILED DESCRIPTION

First Exemplary Embodiment

1. Configuration of Image Forming System

Figure 1:
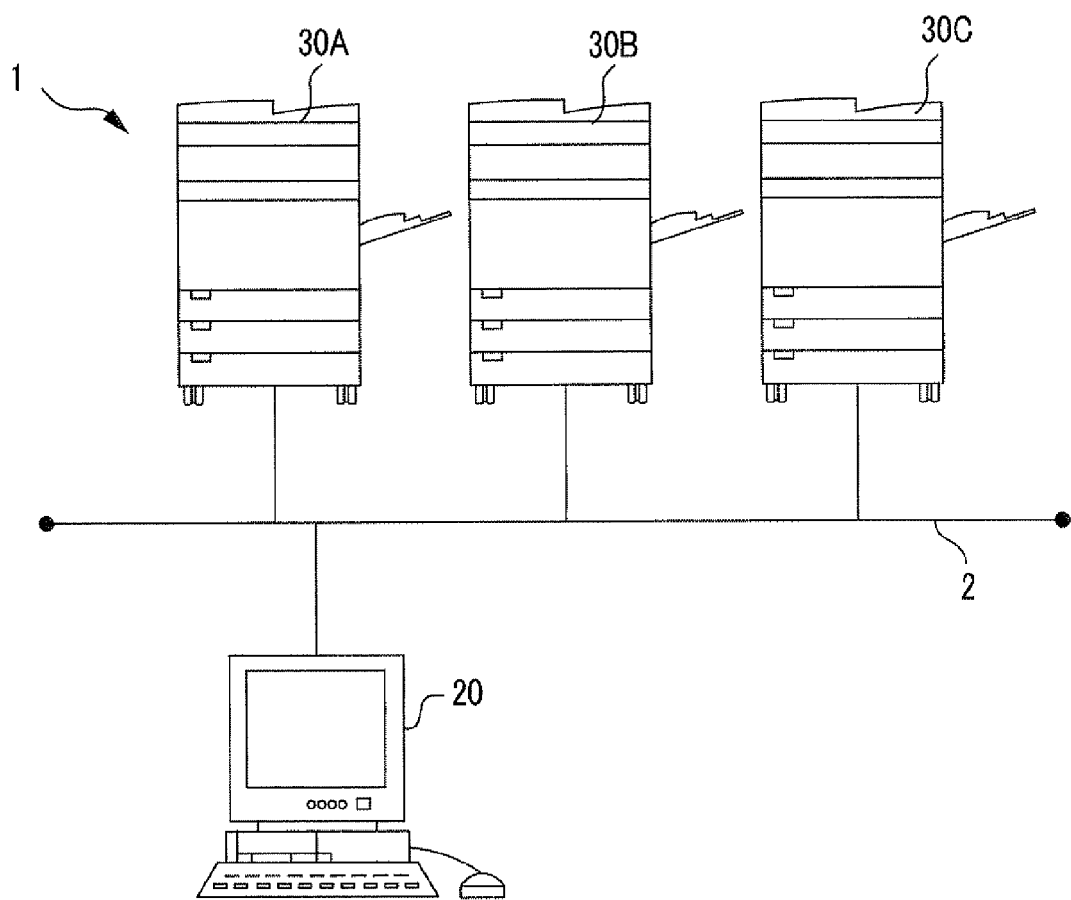
FIG. 1 is a diagram illustrating a configuration of an image forming system according to a first exemplary embodiment.

FIG. 1 is a diagram illustrating a configuration of image forming system 1 according to a first exemplary embodiment. The image forming system 1 includes a client apparatus 20, and image forming apparatuses 30A, 30B and 30C. The client apparatus 20 and the image forming apparatuses 30A, 30B and 30C are connected to each other via a communication line 2. In addition, in the following explanation, when it is not necessary to differentiate the image forming apparatuses 30A, 30B and 30C from each other, the apparatuses are collectively referred to as "an image forming apparatus 30" or "image forming apparatuses 30".

Figure 2:
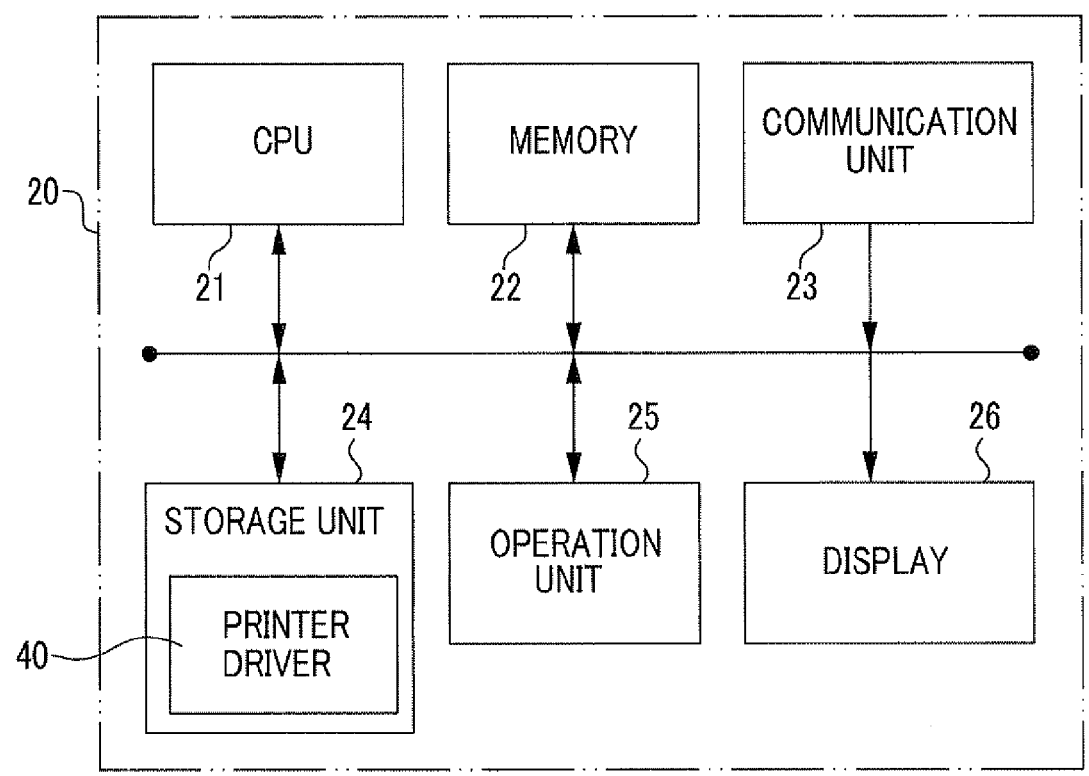
FIG. 2 is a diagram illustrating a hardware configuration of the client apparatus.

FIG. 2 is a diagram illustrating a hardware configuration of the client apparatus 20. The client apparatus 20 includes a CPU (Central Processing Unit) 21, a memory 22, a communication unit 23, a storage unit 24, an operation unit 25, and a display 26. The CPU 21 controls the respective units of the client apparatus 20 by executing a program stored in the memory 22. The communication unit 23 is a communication interface connected to the communication line 2. The client apparatus 20 communicates with the image forming apparatus 30 using the communication unit 23. The storage unit 24 is a storage device such as a hard disk. The storage unit 24 stores a printer driver 40. The printer driver 40 is a program which has a function of controlling the image forming apparatuses 30. The operation unit 25 includes, for example, a keyboard and a mouse. The operation unit 25 is used to operate the client apparatus 20. The display 26 is a display device such as a liquid crystal display device.

Figure 3:
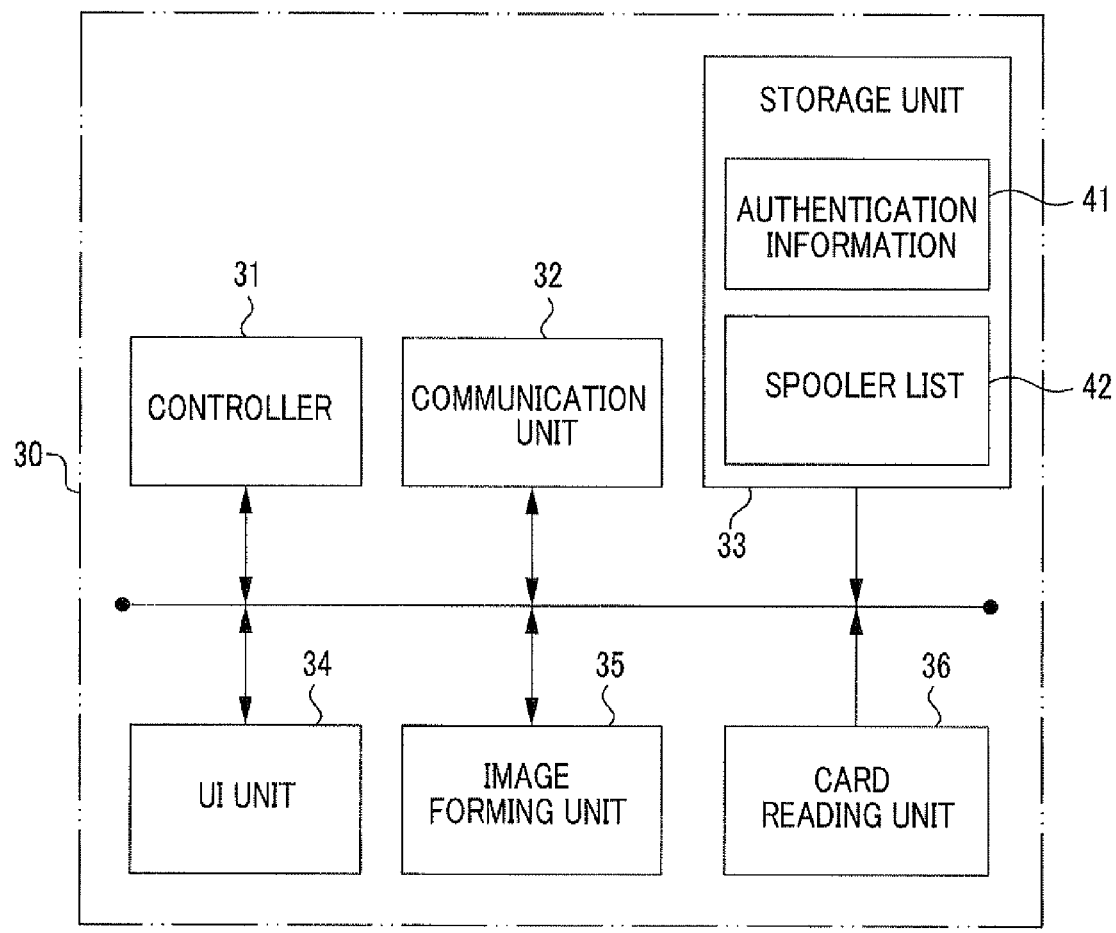
FIG. 3 is a diagram illustrating a hardware configuration of the image forming apparatus.

FIG. 3 is a diagram illustrating a hardware configuration of the image forming apparatus 30. The image forming apparatus 30 includes a controller 31, a communication unit 32, a storage unit 33, a UI (User Interface) unit 34, an image forming unit 35, and a card reading unit 36. The controller 31 controls the respective units of the image forming apparatus 30. The controller 31 includes, for example, a CPU and a memory. The CPU realizes functions of the controller 31 by executing a program stored in the memory. The communication unit 32 is a communication interface connected to the communication line 2. The image forming apparatus 30 communicates with the client apparatus 20 or the other image forming apparatuses 30 using the communication unit 32. The storage unit 33 is a storage device such as a hard disk or a flash memory. The storage unit 33 stores authentication information 41 and a spooler list 42. The storage unit 33 stores image data transmitted from the client apparatus 20.

The UI unit 34 includes, for example, a touch screen and an operation button. The UI unit 34 is used to operate the image forming apparatus 30. The image forming unit 35 is, for example, an electronic photography type printer. The image forming unit 35 forms (prints) an image corresponding to image data on a medium such as paper. The card reading unit 36 reads information stored on an IC (Integrated Circuit) card, in a noncontact manner. The IC card is given to a user in advance in order to perform user authentication. In addition, in the following description, when it is necessary to differentiate the configurations of the image forming apparatuses 30R, 30B and 30C from each other, description is made by adding the letters "A", "B", and "C" to the respective reference numerals.

FIG. 4 is a diagram illustrating an example of the authentication information 41. The authentication information 41 describes a set of a user ID and a password. The user ID is information for identifying a user. The password is information for confirming that a user is the person himself/herself. The password is set by a user. The authentication information 41 shown in FIG. 4 describes a set of the user ID "user 001" and the password "1234".

Figure 5:
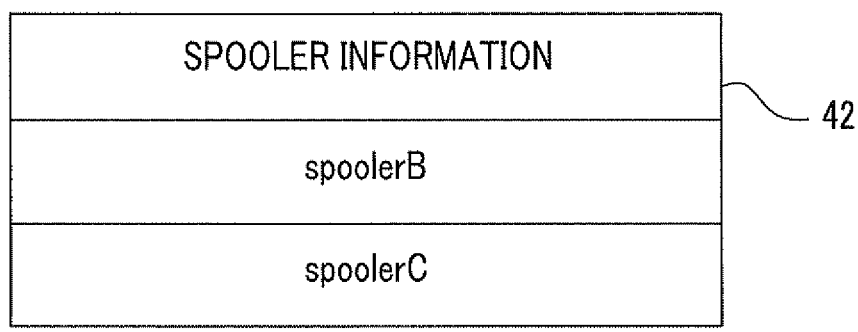
FIG. 5 is a diagram illustrating an example of the spooler list.

FIG. 5 is a diagram illustrating an example of the spooler list 42 stored in the storage unit 33A of the image forming apparatus 30A. The spooler list 42 describes spooler information indicating other image forming apparatuses 30 which are storage destinations of image data. As the spooler information, for example, an IP (Internet Protocol) address or an identification number assigned to the image forming apparatus 30 is used. The spooler list 42 shown in FIG. 5 describes the spooler information "spooler B" and the spooler information "spooler C". The spooler information "spooler B" and "spooler C" respectively indicate the image forming apparatuses 30B and 30C.

Figure 6:
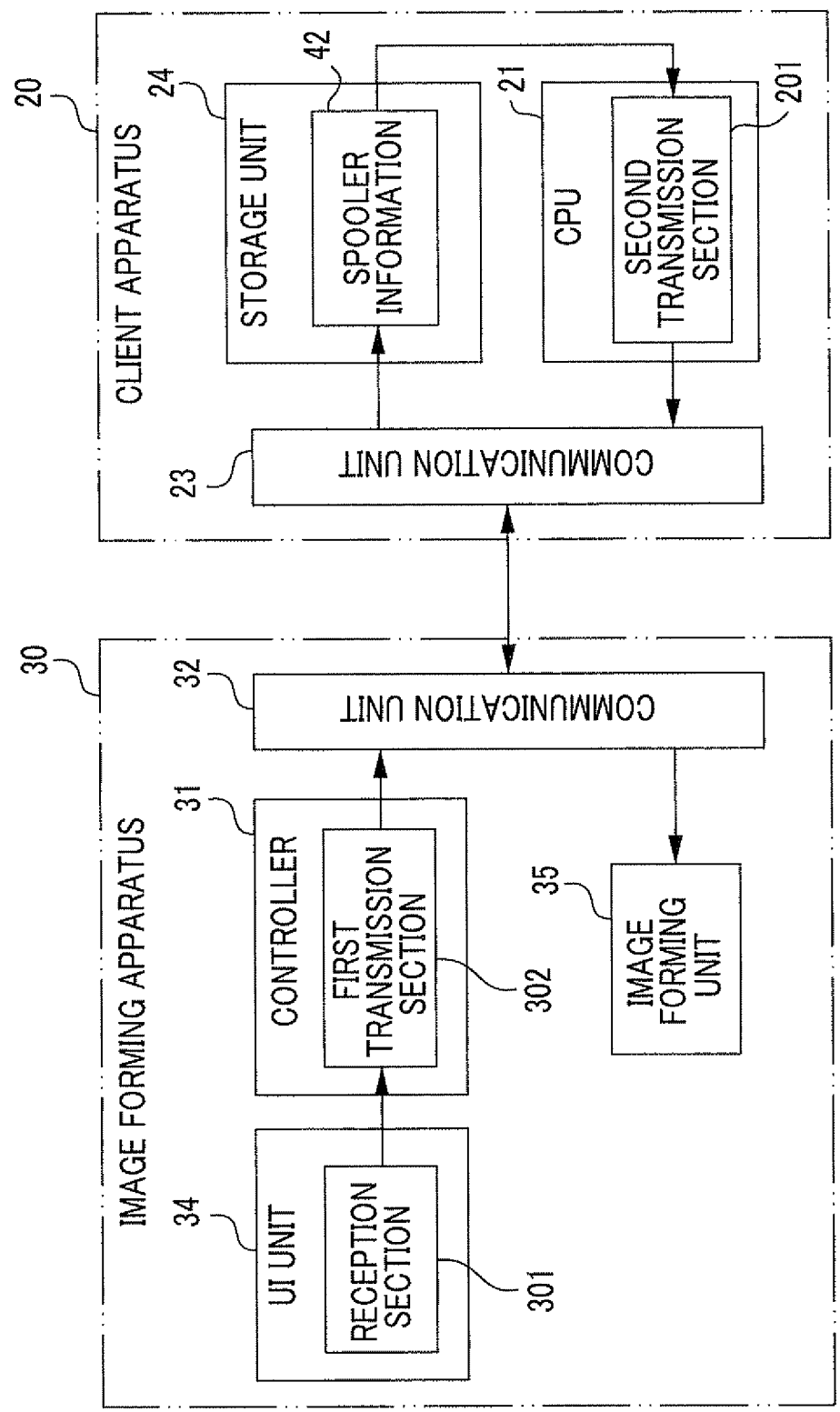
FIG. 6 is a diagram illustrating a functional configuration of the image forming system according to the first exemplary embodiment.

FIG. 6 is a diagram illustrating a functional configuration of the image forming system 1. In the first exemplary embodiment, the client apparatus 20 functions as a transmission apparatus. A reception section 301 is realized by the UI unit 34. A first transmission section 302 is realized by, for example, the CPU executing a program in the controller 31. A second transmission section 201 is realized by the CPU 21 executing a program. The reception section 301 receives a designation of the client apparatus 20. The first transmission section 302 transmits spooler information indicating the own apparatus to the client apparatus 20 designated in the reception section 301. The spooler information is an example of the apparatus information indicating the image forming apparatus 30. The storage unit 24 stores the spooler information transmitted from the first transmission section 302. That is to say, in the first exemplary embodiment, the storage unit 24 functions as a first storage unit. The second transmission section 201 transmits image data to the image forming apparatus 30 indicated by the spooler information stored in the storage unit 24. The image forming unit 35 forms an image corresponding to the image data transmitted from the second transmission section 201.

2. Operation of Image Forming System (1) Setting Operation

Figure 7:
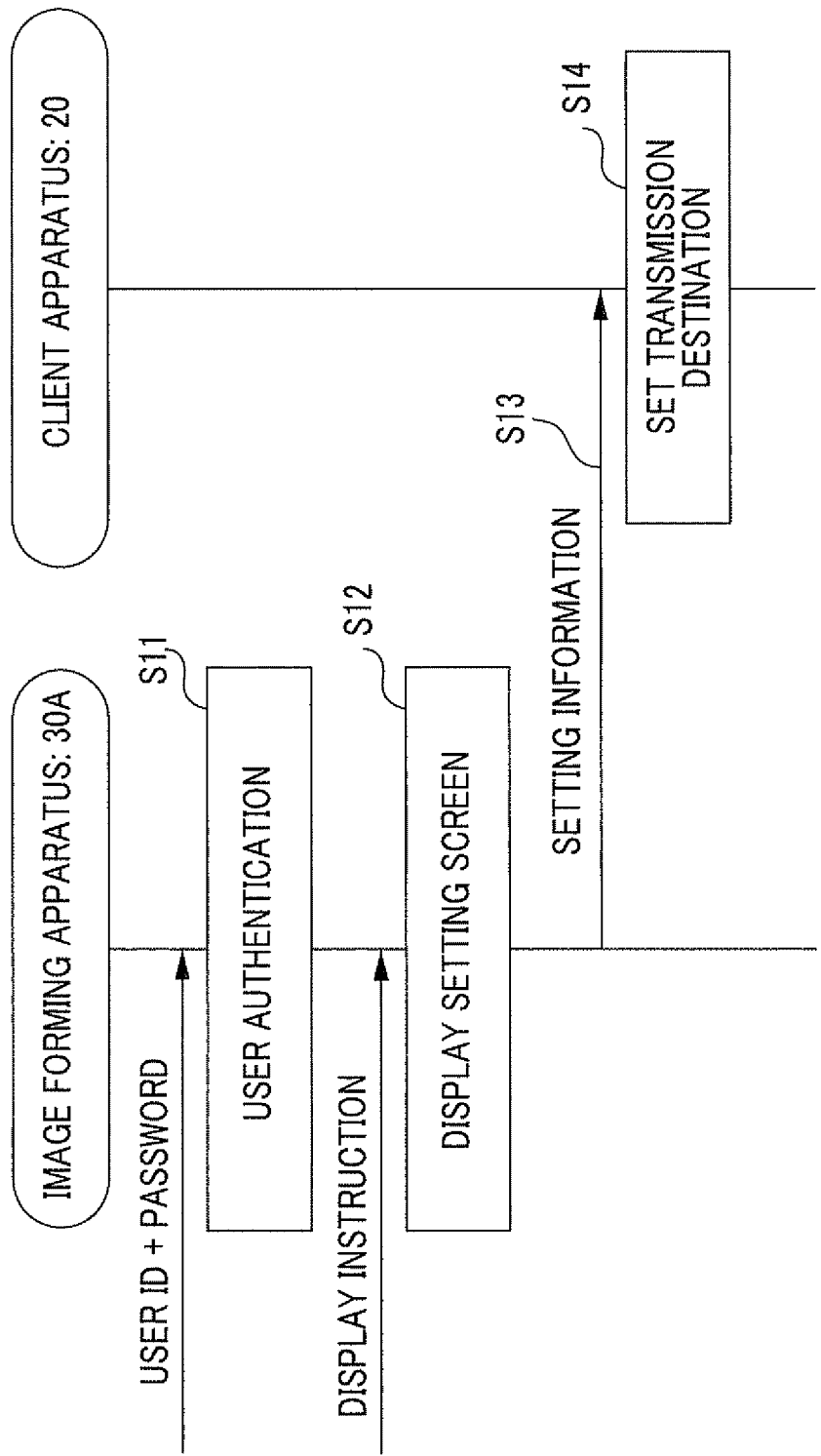
FIG. 7 is a sequence chart illustrating a setting operation according to the first exemplary embodiment.

FIG. 7 is a sequence chart illustrating a setting operation according to the first exemplary embodiment. A user selects a desired image forming apparatus 30 from the image forming apparatuses 30A, 30B and 30C, and moves to the image forming apparatus 30 in order to use the selected image forming apparatus 30. For example, the user moves to the image forming apparatus 30 which is near to the user's seat and is the most convenient for use. Here, it is assumed that the user moves to the image forming apparatus 30A.

An authentication screen is displayed on the UI unit 34 of the image forming apparatus 30, and if authentication is not performed, an operation of the image forming apparatus 30 is not accepted. The user inputs a user ID by touching the IC card of the user on the card reading unit 36A. The IC card stores the user ID "user 001". In addition, the user inputs the password using the UI unit 34A. Here, it is assumed that the password "1234" is input by the user.

When the user ID and the password are input, the image forming apparatus 30A performs user authentication using the input user ID and password (step S11). Specifically, the card reading unit 36A reads the user ID "user 001" from the IC card. The UI unit 34A receives an input of the password "1234". The controller 31A determines whether or not a set of the user ID "user 001" and the password "1234" is included in the authentication information 41 which is stored in the storage unit 33A. When a set of the user ID "user 001" and the password "1234" is not included in the authentication information 41, the controller 31A displays a message indicating the user authentication fails on the UI unit 34A, and finishes this process. In this case, the user cannot use the image forming apparatus 30A. However, a set of the user ID "user 001" and the password "1234" is included in the authentication information 41 shown in FIG. 4. As such, when a set of the user ID "user 001" and the password "1234" is included in the authentication information 41, the controller 31A displays a message indicating the user authentication is successful on the UI unit 34A.

Figure 8:
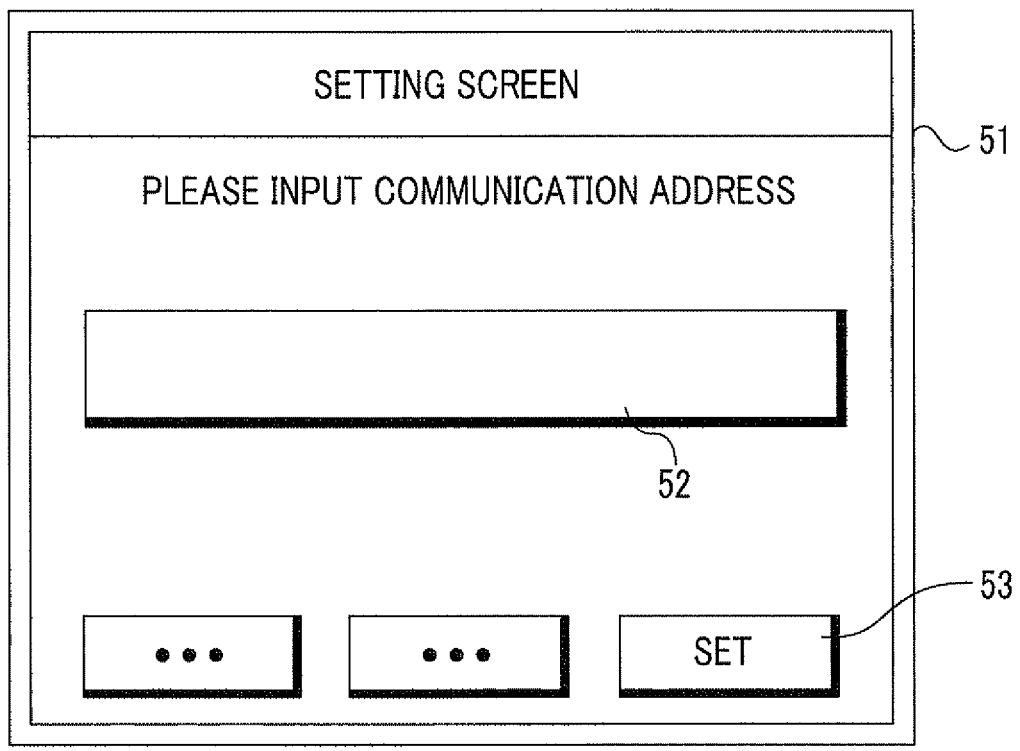
FIG. 8 is a diagram illustrating an example of the setting screen according to the first exemplary embodiment.

If the user authentication is successful, the user operates the image forming apparatus 30A, and sets the image forming apparatus 30A as a transmission destination of image data from the client apparatus 20. Specifically, the user performs an operation for instructing a setting screen 51 to be displayed using the UI unit 34A. When this operation is performed, the controller 31A displays the setting screen 51 on the UI unit 34A (step S12). FIG. 8 is a diagram illustrating an example of the setting screen 51. The setting screen 51 is provided with a text box 52 and a setting button 53. The text box 52 receives an input of the communication address of the client apparatus 20. As the communication address, for example, an IP address is used. The setting button 53 receives an instruction for setting the image forming apparatus 30A as a transmission destination of the image data. The user performs an operation for designating the client apparatus 20 using the UI unit 34A. Specifically, the user inputs the communication address of the client apparatus 20 to the text box 52 using the UT unit 34A. Next, the user presses the setting button 53 using the UI unit 34A.

When the setting button 53 is pressed, the image forming apparatus 30A transmits setting information including the spooler information of the own apparatus to the client apparatus 20 (step S13). Specifically, the controller 31A creates setting information including the spooler information assigned to the image forming apparatus 30A in advance. Here, it is assumed that the spooler information "spooler A" is assigned to the image forming apparatus 30A. The controller 31A controls the communication unit 32A so as to transmit the created setting information to the communication address input in the text box 52. The setting information is transmitted using a protocol such as, for example, an FTP (File Transfer Protocol) or an SMB (Server Message Block). Thereby, the spooler information "spooler A" indicating the image forming apparatus 30A is transmitted to the client apparatus 20 designated by the user.

When receiving the setting information from the image forming apparatus 30A, the client apparatus 20 sets a transmission destination of image data on the basis of the received setting information (step S14). Specifically, the CPU 21 extracts the spooler information "spooler A" from the received setting information, and stores the extracted spooler information in the storage unit 24. Thereby, the image forming apparatus 30A is set as a transmission destination of image data.

(2) Printing Operation

Figure 9:
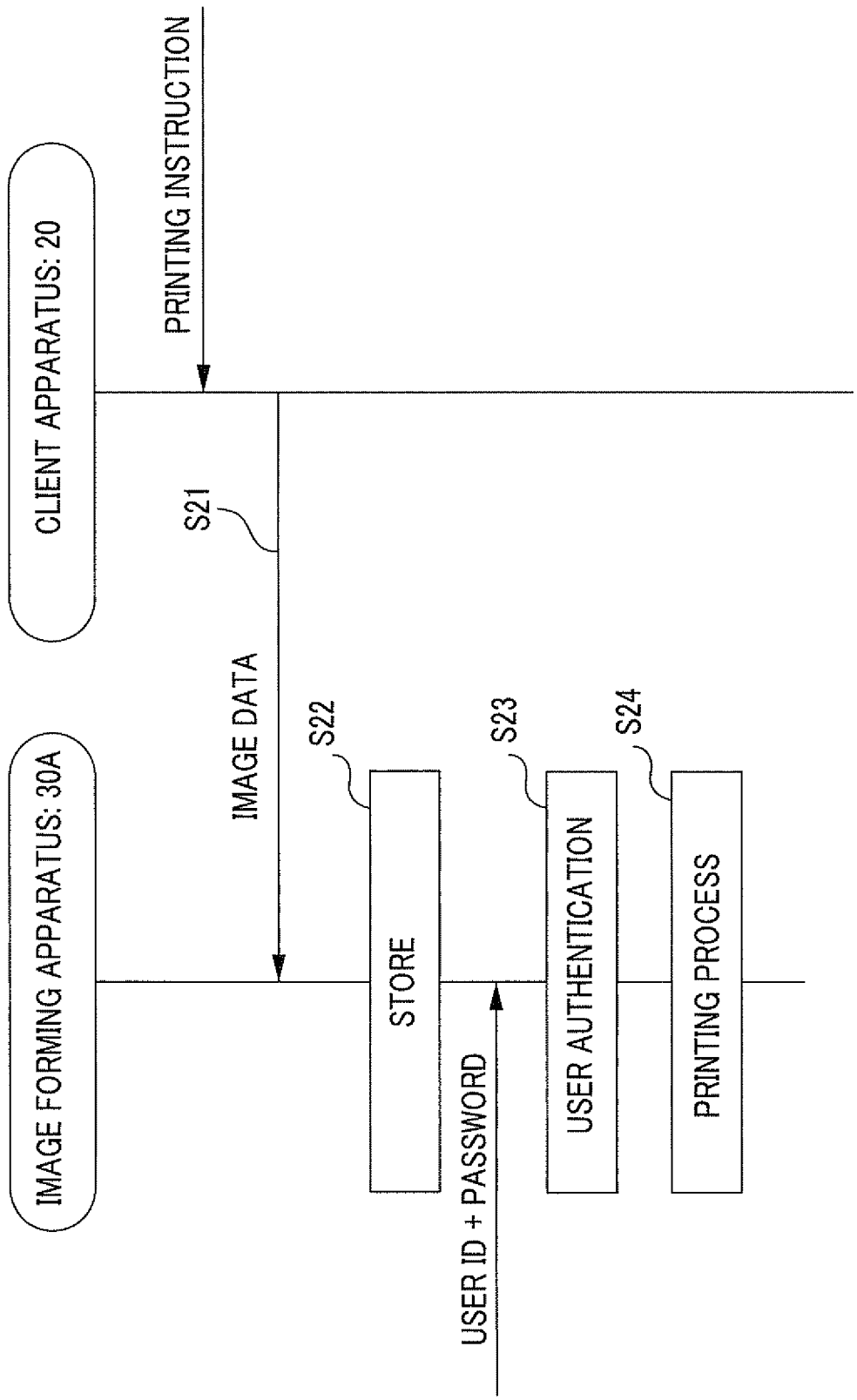
FIG. 9 is a sequence chart illustrating a printing operation according to the first exemplary embodiment.

FIG. 9 is a sequence chart illustrating a printing operation according to the first exemplary embodiment. The user operates the client apparatus 20 so as to perform a printing instruction. Specifically, the user designates image data and instructs printing using the operation unit 25. Here, it is assumed that the user designates image data D1 which is instructed to be printed. When the printing instruction is performed, the client apparatus 20 transmits the image data D1 to the image forming apparatus 30 set as the transmission destination of image data by the printer driver 40 (step S21). Specifically, the user ID "user 001" is set in the printer driver 40 in advance. First, the CPU 21 adds attribute information including the user ID to the image data D1. Next, the CPU 21 controls the communication unit 23 so as to transmit the image data D1 to the image forming apparatus 30A indicated by the spooler information "spooler A" stored in the storage unit 24.

When receiving the image data D1 from the client apparatus 20, the image forming apparatus 30A stores the image data D1 in the storage unit 33A. Thereby, the image data D1 is stored in the image forming apparatus 30A (step S22). After performing the printing instruction, the user moves to the image forming apparatus 30A. The user inputs the user ID "user 001" by touching the IC card of the user on the card reading unit 36A. In addition, the user inputs the password using the UI unit 34A. The image forming apparatus 30A performs user authentication in the same manner as step S11 described above (step S23).

If the user authentication is successful, the image forming apparatus 30A acquires image data corresponding to the user ID "user 001" and performs a printing process based on the acquired image data (step 324). Specifically, if the image data to which the attribute information including the user ID "user 001" is added is stored in the storage unit 33A, the controller 31A reads the image data from the storage unit 33A.

In addition, the controller 31A specifies other image forming apparatuses 30 which are storage destinations of the image data on the basis of the spooler list 42 stored in the storage unit 33A. The spooler list 42 shown in FIG. 5 describes the spooler information "spooler B" and the spooler information "spooler C". In this case, the controller 31A specifies the image forming apparatus 30B indicated by the spooler information "spooler B" and the image forming apparatus 30C indicated by the spooler information "spooler C". The controller 31A controls the communication unit 32A so as to request the image data to which the attribute information including the user ID "user 001" is added at the specified image forming apparatuses 30B and 30C. When the image data requested by the image forming apparatus 30A is stored in the storage units 33B and 33C, the image forming apparatuses 30B and 30C read the image data from the storage units 33B and 33C and transmit the image data to the image forming apparatus 30A. When the image data is transmitted from the image forming apparatuses 30B and 30C, the image forming apparatus 30A receives the image data.

As described above, the storage unit 33A stores the image data D1. The attribute information including the user ID "user 001" is added to the image data D1. In this case, the controller 31A reads the image data D1 from the storage unit 33A. The controller 31A supplies the image data D1 to the image forming unit 35A so as to form an image corresponding to the image data D1. The image forming unit 35A forms the image corresponding to the image data D1 on a medium under the control of the controller 31A.

According to the first exemplary embodiment, even if the user does not grasp spooler information indicating the image forming apparatus 30, the image forming apparatus 30 is set as a transmission destination of image data. In addition, in the first exemplary embodiment, the image forming apparatus 30 set as a transmission destination of image data is selected by the user. Therefore, if the user sets the image forming apparatus 30 which is normally used as a transmission destination of image data, the image data is transmitted to the image forming apparatus 30 which is normally used. In this case, when a printing process is performed, image data is not acquired from the other image forming apparatuses 30. Thus, a frequency where image data is transmitted between the image forming apparatuses 30 is lower than a case where the image forming apparatus 30 which is not normally used by the user is set as a transmission destination of image data.

Further, in the first exemplary embodiment, for example, the printer driver 40 itself is not transmitted from the image forming apparatus 30 to the client apparatus 20, but only the spooler information is transmitted from the image forming apparatus 30 to the client apparatus 20. Therefore, according to the first exemplary embodiment, a process of setting a transmission destination of image data is easily performed. In addition, the image forming system 1 has a structure where image data is stored in any one of the image forming apparatuses 30A, 30B and 30C, and an image corresponding to the image data may be formed using any image forming apparatus 30. In the image forming system 1, when there are plural client apparatuses 20, for example, if different printer drivers 40 are delivered to and installed in the client apparatuses 20 from the image forming apparatuses 30, there is concern that inconvenience occurs, for example, in a circumstance where a particular printer driver 40 which limits various settings is used in the image forming system 1, the printer drivers 40 installed in the client apparatuses 20 are appropriately updated when limitations are updated. In addition, a user is required to search the client apparatuses 20 for the printer driver 40. An administrator of the image forming system 1 stores a common printer driver 40, for example, in a single server apparatus, and notifies the user of a storage location of the server apparatus, which is convenient for both the user and the administrator. For this reason, in the first exemplary embodiment, the printer driver 40 itself is not transmitted but the spooler information is transmitted.

Second Exemplary Embodiment

1. Configuration of Image Forming System

Figure 10:
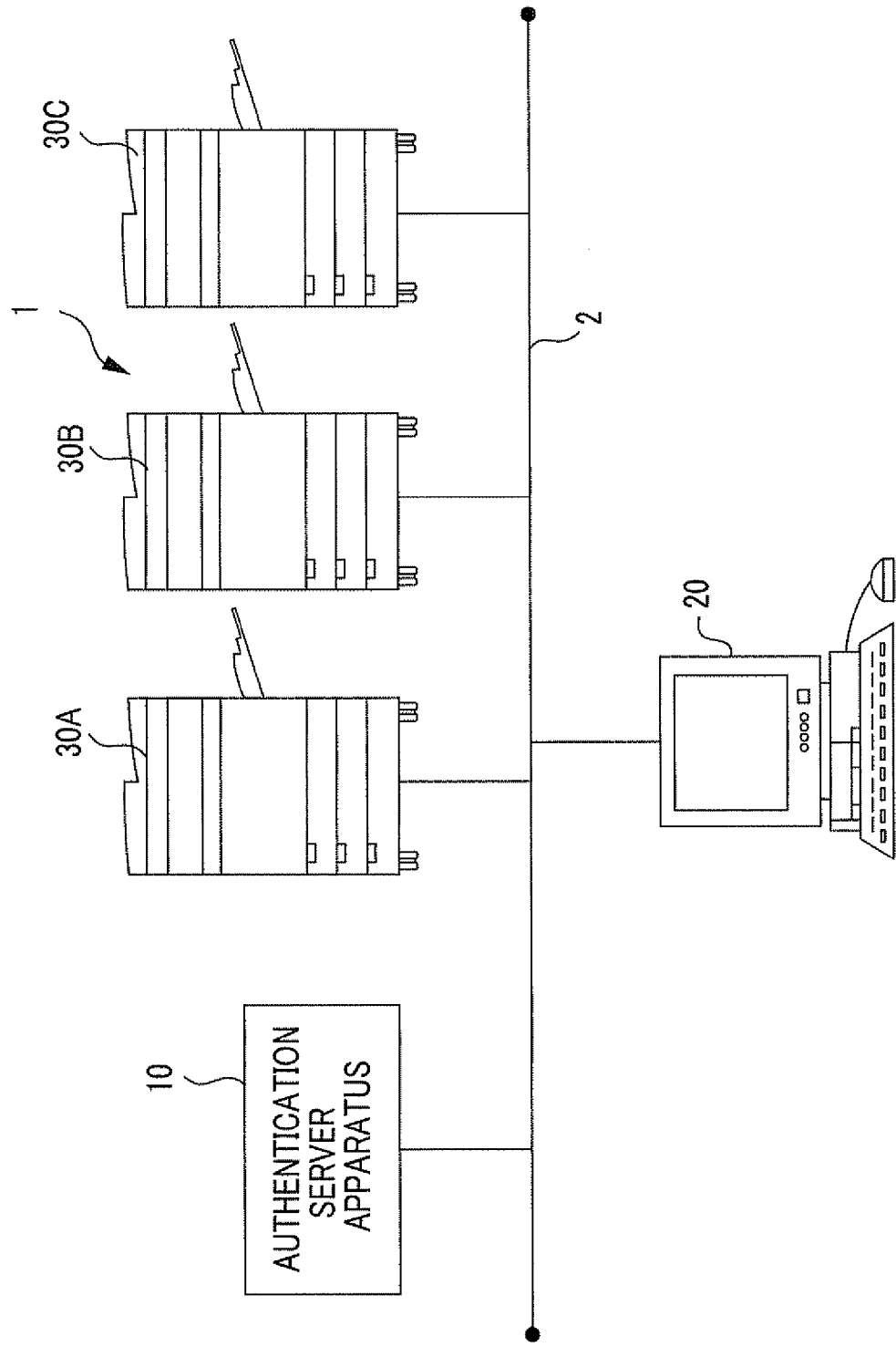
FIG. 10 is a diagram illustrating a configuration of an image forming system according to a second exemplary embodiment.

FIG. 10 is a diagram illustrating an image forming system 1 according to a second exemplary embodiment. The image forming system 1 includes an authentication server apparatus 10, a client apparatus 20, and image forming apparatuses 30A, 30B and 30C. The authentication server apparatus 10, the client apparatus 20, and the image forming apparatuses 30A, 30B and 30C are connected to each other via a communication line 2. In addition, in the following, when it is not necessary to differentiate the image forming apparatuses 30A, 30B and 30C from each other are collectively referred to as "an image forming apparatus 30/image forming apparatuses 30". Configurations of the client apparatus 20 and the image forming apparatus 30 according to the second exemplary embodiment are the same as the configurations described in the first exemplary embodiment, and thus description thereof will be omitted.

Figure 11:
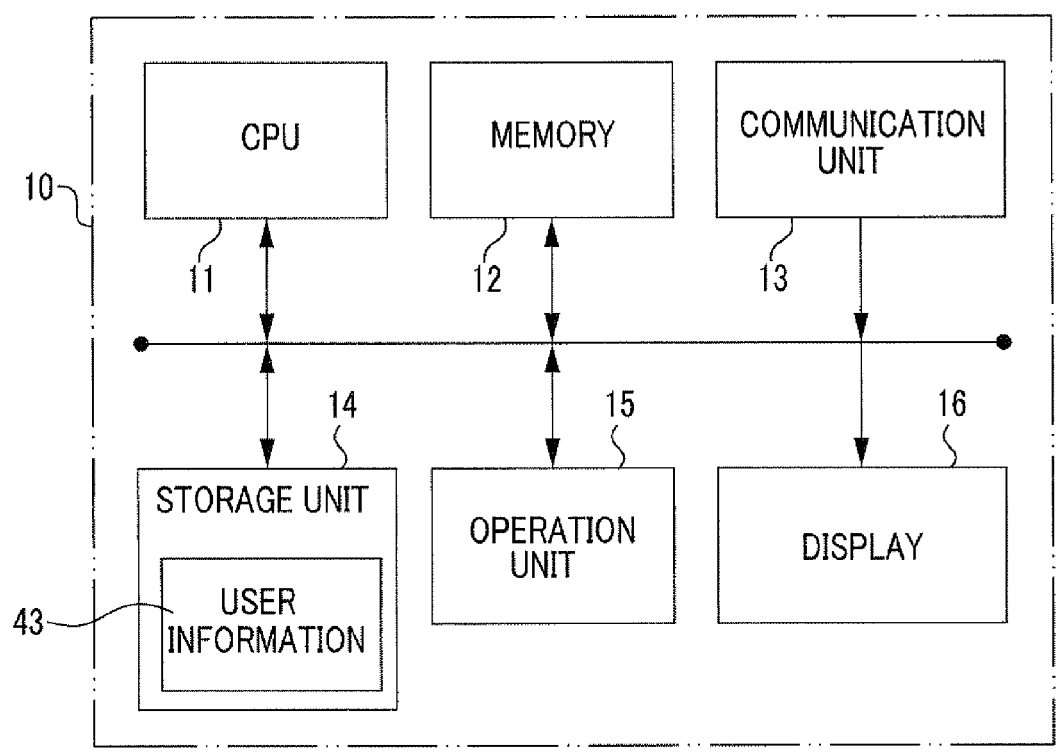
FIG. 11 is a diagram illustrating a hardware configuration of the authentication server apparatus.

FIG. 11 is a diagram illustrating a hardware configuration of the authentication server apparatus 10. The authentication server apparatus 10 includes a CPU 11, a memory 12, a communication unit 13, a storage unit 14, an operation unit 15, and a display 16. The CPU 11 controls the respective units of the authentication server apparatus 10 by executing a program stored in the memory 12. The communication unit 13 is a communication interface connected to the communication line 2. The authentication server apparatus 10 communicates with the client apparatus 20 or the image forming apparatuses 30 using the communication unit 13. The storage unit 14 is a storage device such as a hard disk. The storage unit 14 stores user information 43. The operation unit 15 includes, for example, a keyboard and a mouse. The operation unit 15 is used to operate the authentication server apparatus 10. The display 16 is a display device such as a liquid crystal display device.

Figure 12:
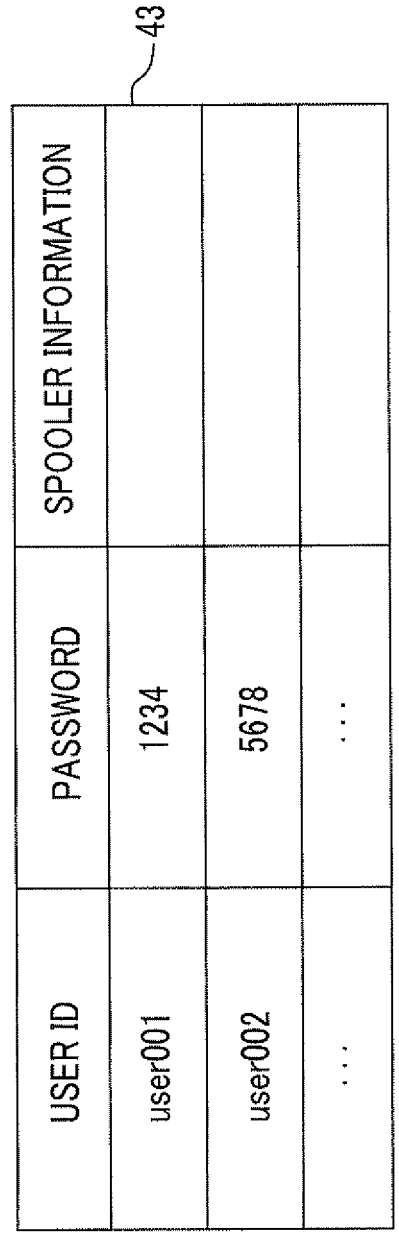
FIG. 12 is a diagram illustrating an example of the user information.

FIG. 12 is a diagram illustrating an example of the user information 43. The user information 43 describes a set of a user ID and a password in the same manner as the above-described authentication information 41. In addition, the user information 43 describes spooler information so as to be correlated with each user ID. In addition, the spooler information is not described when the user information 43 is created, and is added when a setting operation is performed.

Figure 13:
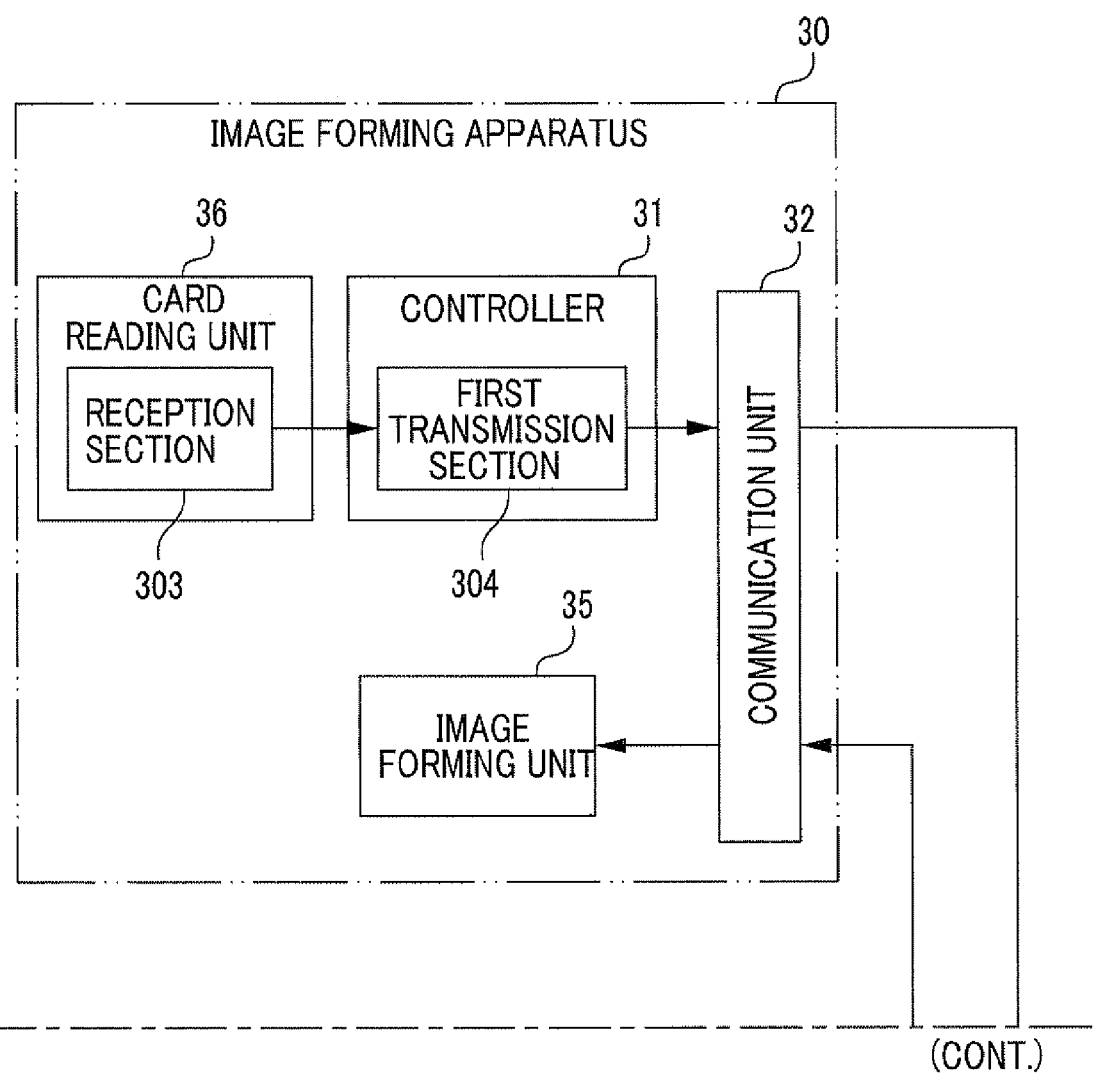
FIG. 13 is a diagram illustrating a functional configuration of the image forming system according to the second exemplary embodiment.

FIG. 13 is a diagram illustrating a functional configuration of the image forming system 1 according to the second exemplary embodiment. In the second exemplary embodiment, the client apparatus 20 functions as a transmission apparatus, and the authentication server apparatus 10 functions as a management apparatus. A reception section 303 is realized by the card reading unit 36. A first transmission section 304 is realized by, for example, the CPU executing a program in the controller 31. An acquisition section 202 and a second transmission section 203 are realized by the CPU 21 executing a program.

The reception section 303 receives an input of the user ID. The user ID is an example of user information for identifying a user. The first transmission section 304 transmits the input user ID and spooler information indicating the own apparatus to the authentication server apparatus 10. The spooler information is an example of the apparatus information indicating the image forming apparatus 30. The storage unit 14 correlates the user ID and the spooler information transmitted from the first transmission section 304 with each other so as to be stored in the user information 43. The acquisition section 202 acquires spooler information which is correlated with a preset user ID and is stored in the storage unit 14. The second transmission section 203 transmits image data to the image forming apparatus 30 indicated by the spooler information acquired by the acquisition section 202. The image forming unit 35 forms an image corresponding to the image data transmitted from the second transmission section 203.

2. Operation of Image Forming System
(1) Setting Operation

FIG. 14 is a sequence chart illustrating a setting operation according to the second exemplary embodiment. A user selects a desired image forming apparatus 30 from the image forming apparatuses 30A, 30B and 300, and moves to the image forming apparatus 30 in order to use the selected image forming apparatus 30. For example, the user moves to the image forming apparatus 30 which is near to the user's seat and is the most convenient for use. Here, it is assumed that the user moves to the image forming apparatus 30A.

An authentication screen is displayed on the UI unit 34 of the image forming apparatus 30, and if authentication is not performed, an operation of the image forming apparatus 30 is not accepted. The user inputs a user ID by touching the IC card of the user on the card reading unit 36A. The IC card stores the user ID "user 001". In addition, the user inputs the password using the UI unit 34A. Here, it is assumed that the password "1234" is input by the user.

When the user ID and the password are input, the image forming apparatus 30A requests the authentication server apparatus 10 to perform user authentication on the basis of the input user ID and password (step S31). Specifically, the controller 31A controls the communication unit 32A so as to transmit the input user ID "user 001" and password "1234" to the authentication server apparatus 10.

The authentication server apparatus 10 performs the user authentication requested by the image forming apparatus 30A (step S32), and makes a response regarding whether or not the user authentication is successful (step S33). Specifically, the CPU 11 determines whether or not a set of the user ID "user 001" and the password "1234" received from the image forming apparatus 30A is included in the user information 43 which is stored in the storage unit 14. When a set of the user ID "user 001" and the password "1234" is not included in the user information 43, the CPU 11 controls the communication unit 13 so as to transmit response information indicating that the user authentication fails to the image forming apparatus 30A. On the other hand, a set of the user ID "user 001" and the password "1234" is included in the user information 43 shown in FIG. 12. As such, if a set of the user ID "user 001" and the password "1234" is included in the user information 43, the CPU 11 controls the communication unit 13 so as to transmit response information indicating that the user authentication is successful to the image forming apparatus 30A.

The image forming apparatus 30A notifies the user of the authentication result on the basis of the response from the authentication server apparatus 10 (step S34). Specifically, when there is a response indicating that the user authentication fails from the authentication server apparatus 10, the controller 31A displays a message indicating the user authentication fails on the UI unit 34A, and finishes this process. In this case, the user cannot use the image forming apparatus 30A. In contrast, when there is a response indicating that the user authentication is successful from the authentication server apparatus 10, the controller 31A displays a message indicating the user authentication is successful on the UI unit 34R.

Figure 15:
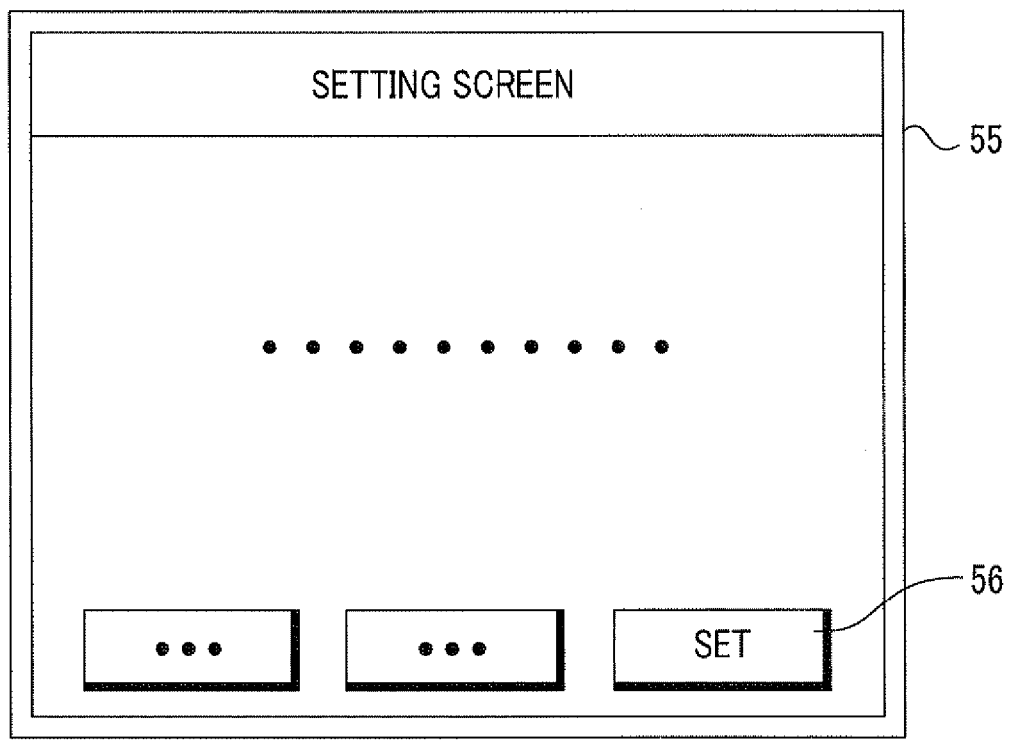
FIG. 15 is a diagram illustrating an example of the setting screen according to the second exemplary embodiment.

If the user authentication is successful, the user operates the image forming apparatus 30A, and sets the image forming apparatus 30A as a transmission destination of image data from the client apparatus 20. Specifically, the user performs an operation for instructing a setting screen 55 to be displayed using the UI unit 34A. When this operation is performed, the controller 31A displays the setting screen 55 on the UI unit 34A (step S35). FIG. 15 is a diagram illustrating an example of the setting screen 55. The setting screen 55 is provided with a setting button 56. The setting button 56 receives an instruction for setting the image forming apparatus 30A as a transmission destination of the image data. The user presses the setting button 56 using the UI unit 34A.

When the setting button 56 is pressed, the image forming apparatus 30A transmits setting information including the input user ID and the spooler information of the own apparatus to the authentication server apparatus 10 (step S36). Specifically, the controller 31A creates setting information including the input user ID "user 001" which is input via the card reading unit 36A and the spooler information assigned to the image forming apparatus 30A in advance. Here, it is assumed that the spooler information "spooler A" is assigned to the image forming apparatus 30A. The controller 31A controls the communication unit 32A so as to transmit the created setting information to the authentication server apparatus 10. The setting information is transmitted using a protocol such as, for example, an FTP (File Transfer Protocol) or an SMB (Server Message Block). Thereby, the user ID input by the user and the spooler information "spooler A" indicating the image forming apparatus 30A are transmitted to the authentication server apparatus 10.

Figure 16:
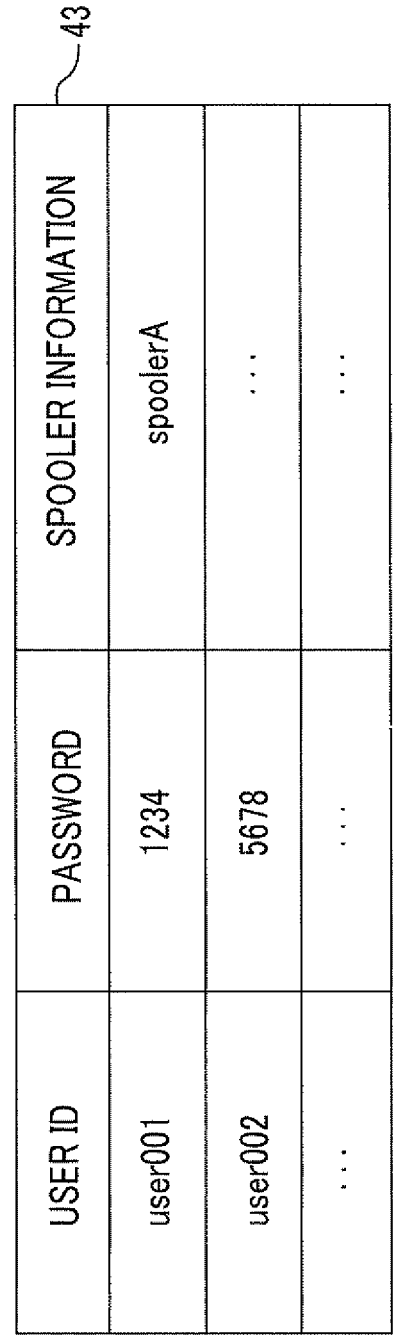
FIG. 16 is a diagram illustrating user information to which spooler information is added.

When receiving the setting information from the image forming apparatus 30A, the authentication server apparatus 10 sets a transmission destination of image data on the basis of the received setting information (step S37). FIG. 16 is a diagram illustrating the user information 43 to which the spooler information is added through this setting. Specifically, the CPU 11 extracts the spooler information "spooler A" from the received setting information, and adds the extracted spooler information to the user information 43 stored in the storage unit 14. In addition, the CPU 11 correlates the user ID "user 001" included in the setting information with the added spooler information "spooler A" in the user information 43. Thereby, the user ID "user 001" and the spooler information "spooler A" are correlated with each other and are stored. In addition, the image forming apparatus 30A is set as a transmission destination of image data corresponding to the user ID "user 001".

(2) Printing Operation

FIG. 17 is a sequence chart illustrating a printing operation according to the second exemplary embodiment. The user inputs the user ID and the password using the operation unit 25 of the client apparatus 20. Here, it is assumed that the user ID "user 001" and the password "1234" are input by the user. When the user ID and the password are input, the client apparatus 20 requests the authentication server apparatus 10 to perform user authentication on the basis of the input user ID and password (step S41). Specifically, the CPU 21 controls the communication unit 23 so as to transmit the input user ID "user 001" and password "1234" to the authentication server apparatus 10.

The authentication server apparatus 10, in the same manner as steps S32 and S33 described above, performs the user authentication requested by the client apparatus 20 (step S42), and makes a response regarding whether or not the user authentication is successful (step S43). The client apparatus 20 notifies the user of the authentication result on the basis of the response from the authentication server apparatus 10 (step S44). Specifically, when there is a response indicating that the user authentication fails from the authentication server apparatus 10, the CPU 21 displays a message indicating the user authentication fails on the display 26. In this case, the user cannot perform a printing instruction. In contrast, when there is a response indicating that the user authentication is successful from the authentication server apparatus 10, the CPU 21 displays a message indicating the user authentication is successful on the display 26.

If the user authentication is successful, the client apparatus 20 acquires the spooler information corresponding to the user ID set in the printer driver 40 in advance from the authentication server apparatus 10. Here, it is assumed that the user ID "user 001" is set in the printer driver 40 in advance. Specifically, the CPU 21 controls the communication unit 23 so as to request the spooler information corresponding to the user ID "user 001" at the authentication server apparatus 10 (step S45). The authentication server apparatus 10 reads the requested spooler information from the storage unit 14 and transmits the spooler information to the client apparatus 20 (step S46). Specifically, the CPU 11 extracts the spooler information "spooler A" correlated with the user ID "user 001" from the user information 43 shown in FIG. 16. The CPU 11 controls the communication unit 13 so as to transmit the extracted spooler information to the client apparatus 20. The client apparatus 20 receives the spooler information "spooler A" from the authentication server apparatus 10.

The user operates the client apparatus 20 so as to perform a printing instruction. Specifically, the user designates image data and instructs printing using the operation unit 25. Here, it is assumed that the user designates image data D1 which is instructed to be printed. When the printing instruction is performed, the client apparatus 20 transmits the image data D1 to the image forming apparatus 30 indicated by the spooler information acquired from the authentication server apparatus (step S47). Specifically, the CPU 21 controls the communication unit 23 so as to transmit the image data D1 to the image forming apparatus 30A indicated by the received spooler information "spooler A". When receiving the image data D1 from the client apparatus 20, the image forming apparatus 30A stores the image data D1 in the storage unit 33A. Thereby, the image data D1 is stored in the image forming apparatus 30A (step S48).

After performing the printing instruction, the user moves to the image forming apparatus 30A. The user inputs the user ID "user 001" by touching the IC card of the user on the card reading unit 36A. In addition, the user inputs the password using the UI unit 34A. When the user ID and the password are input, the image forming apparatus 30A requests the authentication server apparatus 10 to perform user authentication on the basis of the user ID and the password in the same manner as step S31 described above (step S49). The authentication server apparatus 10, in the same manner as steps S32 and S33 described above, performs the user authentication requested by the image forming apparatus 30 (step S50), and makes a response regarding whether or not the user authentication is successful (step S51). In the same manner as step S34 described above, the image forming apparatus 30A notifies the user of the authentication result on the basis of the response from the authentication server apparatus 10 (step S52). If the user authentication is successful, the image forming apparatus 30A, in the same manner as step S24 described above, acquires image data corresponding to the user ID "user 001" and performs a printing process based on the acquired image data (step S53).

In the configuration according to the second exemplary embodiment as well, in the same manner as the first exemplary embodiment, even if a user does not understand spooler information indicating the image forming apparatus 30, the image forming apparatus 30 is set as a transmission destination of image data. Further, in the configuration according to the second exemplary embodiment as well, in the same manner as the first exemplary embodiment, a frequency where image data is transmitted between the image forming apparatuses 30 is lower than a case where the image forming apparatus 30 which is not normally used by the user is set as a transmission destination of image data. In addition, in the configuration according to the second exemplary embodiment as well, in the same manner as the first exemplary embodiment, a process of setting a transmission destination of image data is easily performed.

MODIFIED EXAMPLES

The invention is not limited to the above-described first exemplary embodiment or second exemplary embodiment, and may be modified as follows. In addition, the following modified examples may be combined with each other.

(1) Modified Example 1

In the above-described first exemplary embodiment, there are cases where a printing instruction is performed before a transmission destination of image data is set in step S14. In this case, since spooler information is not stored in the storage unit 24, the client apparatus 20 cannot transmit image data. Therefore, in this case, the client apparatus 20 may preserve image data D1 designated by the user, and may transmit the image data D1 after a transmission destination of the image data is set.

Specifically, when a printing instruction is performed, the CPU 21 determines whether or not spooler information is stored in the storage unit 24. If the spooler information is not stored in the storage unit 24, the CPU 21 stores the image data D1 designated by the user in the storage unit 24. Thereafter, through the process in step S14, the spooler information is stored in the storage unit 24. When the spooler information is stored in the storage unit 24, the CPU 21 reads the image data D1 from the storage unit 24, and transmits the image data D1 to the image forming apparatus 30 indicated by the spooler information, in the same manner as step S21 described above.

According to the modified example 1, even if the spooler information is not stored in the storage unit 24 when the printing instruction is performed, that is, when image data is transmitted, the image data is transmitted when the spooler information is stored. At this time, it is not necessary for the user to operate the client apparatus 20 again in order to perform a printing instruction after setting a transmission destination of image data by operating the image forming apparatus 30. In addition, the operation according to the modified example 1 may be applied to, for example, a case where image data cannot be transmitted to the client apparatus 20 since a failure occurs in the image forming apparatus 30 indicated by spooler information stored in the storage unit 24, or the communication line 2 between the client apparatus 20 and the image forming apparatus 30.

(2) Modified Example 2

In the above-described first exemplary embodiment, a transmission destination of image data may be set in plural. In this case, the user operates the plural image forming apparatuses 30 and sets a primary spooler and a secondary spooler. The primary spooler refers to a storage destination of image data having the highest priority. The secondary spooler refers to a storage destination of image data having the second highest priority. Specifically, the user performs an operation for instructing any one of the setting a setting screen 51A used to set a primary spooler and a setting screen 51B used to set a secondary spooler to be displayed, by the use of the UI unit 34 of the image forming apparatus 30.

When the operation for instructing the setting screen 51A to be displayed is performed, the controller 31 displays the setting screen 51A on the UI unit 34. The setting screen 51A is provided with a setting button 53A which receives an instruction for setting the own apparatus as a primary spooler, in addition to the text box 52 as shown in FIG. 8. In other words, the setting button 53A receives a designation of the priority "1" for the own apparatus. The user inputs a communication address of the client apparatus 20 in the text box 52 and presses the setting button 53A using the UI unit 34. When the setting button 53A is pressed, the controller 31 adds the priority "1" to the spooler information indicating the own apparatus, and performs transmission of the setting information in step S13.

On the other hand, when the operation for instructing the setting screen 51B to be displayed is performed, the controller 31 displays the setting screen 51B on the UI unit 34. The setting screen 51B is provided with a setting button 53B which receives an instruction for setting the own apparatus as a secondary spooler, in addition to the text box 52 as shown in FIG. 8. In other words, the setting button 53B receives a designation of the priority "2" for the own apparatus. The user inputs a communication address of the client apparatus 20 in the text box 52 and presses the setting button 53B using the UI unit 34. When the setting button 53B is pressed, the controller 31 adds the priority "2" to the spooler information indicating the own apparatus, and performs transmission of the setting information in step S13. In addition, in the following description, the spooler information to which the priority "1" is added is referred to as "primary spooler information", and the spooler information to which the priority "2" is added is referred to as "secondary spooler information".

Figure 18:
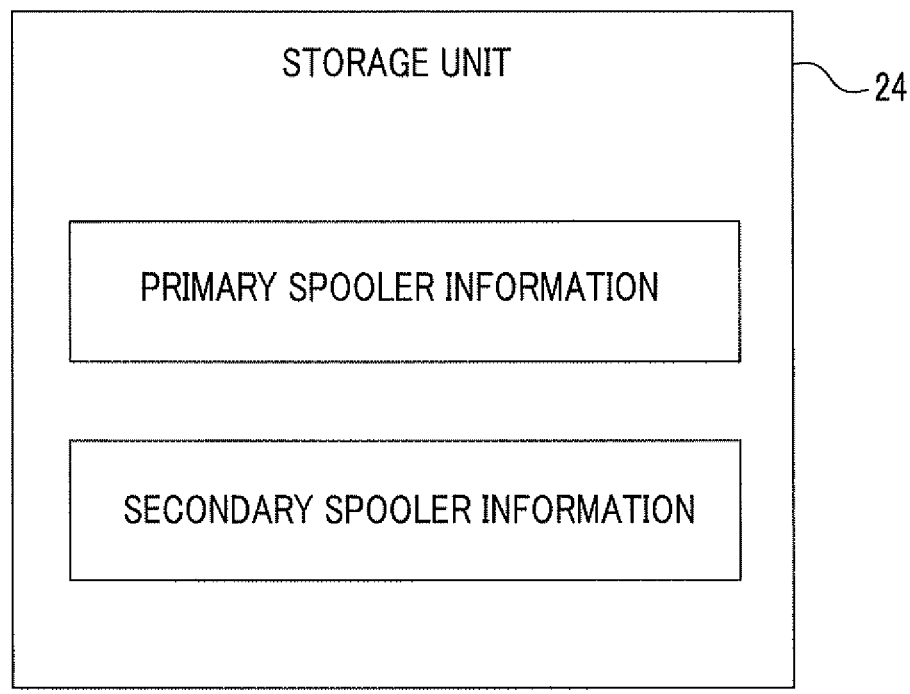
FIG. 18 is a diagram illustrating a storage unit of the client apparatus according to a modified example 2.

When the primary spooler and the secondary spooler are set by the user, the primary spooler information and the secondary spooler information are stored in the storage unit 24 of the client apparatus 20 as shown in FIG. 18. Here, it is assumed that the user operates the image forming apparatus 30A so as to set a primary spooler, and then operates the image forming apparatus 30C so as to set a secondary spooler. In this case, in the storage unit 24, the spooler information "spooler A" indicating the image forming apparatus 30A is stored as the primary spooler information, and the spooler information "spooler C" indicating the image forming apparatus 30C is stored as the secondary spooler information.

The client apparatus 20 transmits image data to the image forming apparatus 30 indicated by the primary spooler information stored in the storage unit 24 or the image forming apparatus 30 indicated by the secondary spooler information. At this time, the image forming apparatus 30 indicated by the primary spooler information is used prior to the image forming apparatus 30 indicated by the secondary spooler information. Specifically, the CPU 21 first transmits image data to the image forming apparatus 30A indicated by the primary spooler information "spooler A". However, when a failure occurs in the image forming apparatus 30A, or a failure occurs in the communication line 2 between the client apparatus 20 and the image forming apparatus 30A, the image data cannot be transmitted to the image forming apparatus 30A. In a circumstance where the image forming apparatus 30A cannot be used as such, the CPU 21 controls the communication unit 23 so as to transmit the image data to the image forming apparatus 30C indicated by the secondary spooler information "spooler C". Thereby, even if the image forming apparatus 30 indicated by the primary spooler information cannot be used, the image data is stored in the image forming apparatus 30 indicated by the secondary spooler information.

In other words, the client apparatus 20 transmits image data to the image forming apparatus 30 indicated by spooler information which is available and has the highest priority added among the image forming apparatuses 30 indicated by the spooler information stored in the storage unit 24. The term "available" refers to capable of storing image data in the image forming apparatus 30. Whether or not the image forming apparatus 30 is available is determined depending on, for example, whether or not an echo response is returned by an image forming apparatus 30 after an echo request is transmitted to the image forming apparatus 30. When the image forming apparatus 30 and the communication line 2 are normally operated, an echo response is returned by the image forming apparatus 30. On the other hand, when a failure occurs in the image forming apparatus 30, or a failure occurs in the communication line 2 between the client apparatus 20 and, the image forming apparatus 30, an echo response is not returned by the image forming apparatus 30. If the echo response is not returned within a designated period of time, the client apparatus 20 determines that the image forming apparatus 30 is in unavailable circumstances.

In addition, in the above-described second exemplary embodiment as well, a transmission destination of image data may be set in plural. In this case, user information 43A is stored in the storage unit 14 of the authentication server apparatus 10. FIG. 19 is a diagram illustrating an example of the user information 43A according to the modified example 2. In addition, as described above, the user operates the plural image forming apparatuses 30 so as to set a primary spooler and a secondary spooler. When the primary spooler and the secondary spooler are set by the user, the primary spooler information and the secondary spooler information are added to the user information 43A. In this case, the client apparatus 20 acquires the primary spooler information and secondary spooler information from the authentication server apparatus 10 in steps S45 and S46 described above. In addition, the client apparatus 20, as described above, transmits image data to the image forming apparatus 30 indicated by spooler information which is available and has the highest priority added among the image forming apparatuses 30 indicated by the acquired spooler information. Thereby, even if the image forming apparatus 30 indicated by the primary spooler information cannot be used, the image data is stored in the image forming apparatus 30 indicated by the secondary spooler information.

(3) Modified Example 3

Figure 20:
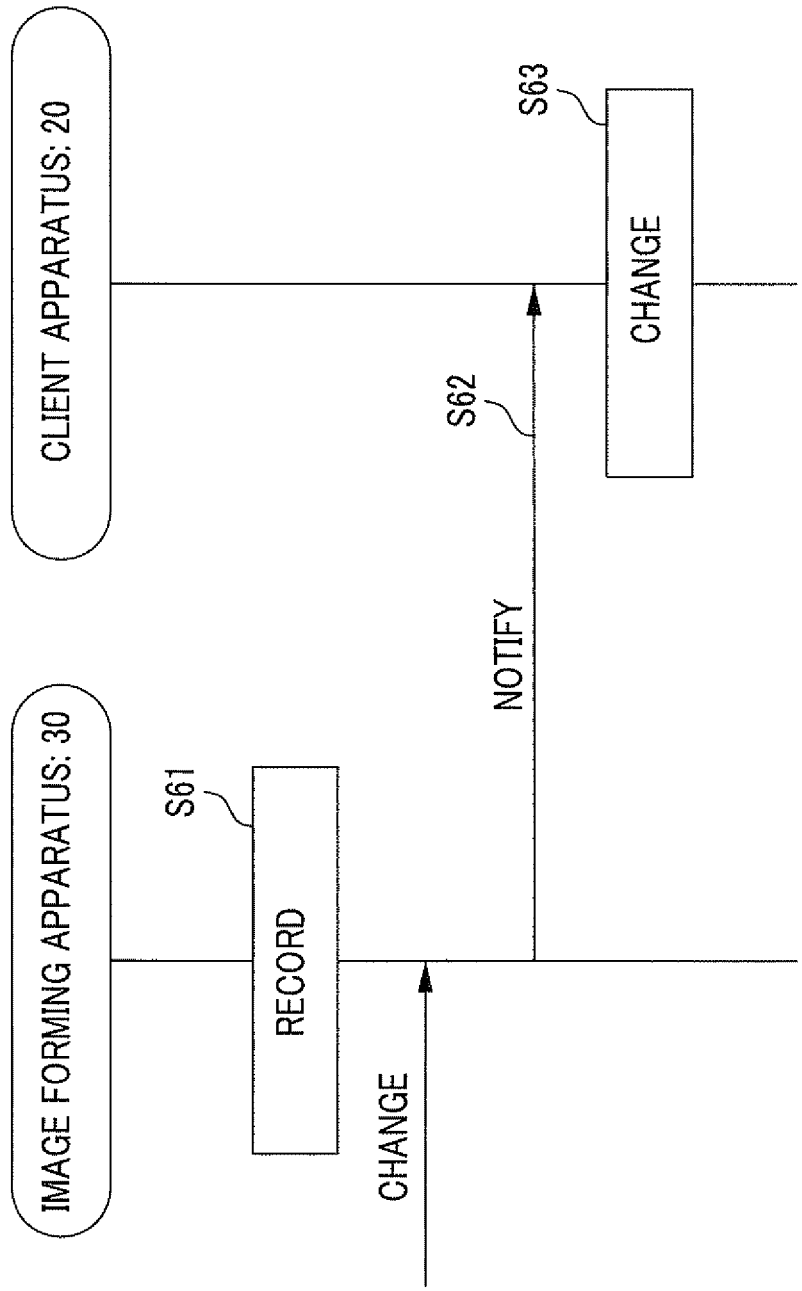
FIG. 20 is a sequence chart illustrating a changing operation of spooler information according to a modified example 3.

In the above-described first exemplary embodiment, there are cases where spooler information for the image forming apparatus 30 may be changed. In this case, the image forming apparatus 30 may notify the client apparatus 20 of the changed spooler information. FIG. 20 is a sequence chart illustrating a changing operation of spooler information according to the modified example 3. The image forming apparatus 30 records the previous communication address to which changed information is transmitted in step S13 described above (step S61). Specifically, the controller 31 stores the communication address of the client apparatus 20 input in the text box 52 of the setting screen 51 in the storage unit 33. In other words, in the modified example 3, the storage unit functions as a second storage unit. When spooler information for the own apparatus is changed, the image forming apparatus 30 sends a notification of the change in the spooler information to all the recorded communication addresses (step S62). Specifically, the controller 31 controls the communication unit 32 so as to transmit spooler information before being changed and spooler information after being changed to all the communication addresses stored in the storage unit 33. In other words, in the modified example 3, the controller 31 functions as a third transmission unit.

The client apparatus 20 changes spooler information stored in the storage unit 24 in response to the notification from the image forming apparatus 30 (step S63). Specifically, when the spooler information before being changed and the spooler information after being changed are received from the image forming apparatus 30, the CPU 21 determines whether or not the received spooler information before being changed is stored in the storage unit 24. If the spooler information before being changed is stored in the storage unit 24, the CPU 21 rewrites the spooler information before being changed, stored in the storage unit 24, to the received spooler information after being changed. In other words, in the modified example 3, the CPU 21 functions as a changing unit. Thereby, the spooler information stored in the client apparatus 20 is changed according to the change in the spooler information of the image forming apparatus 30.

Figure 21:
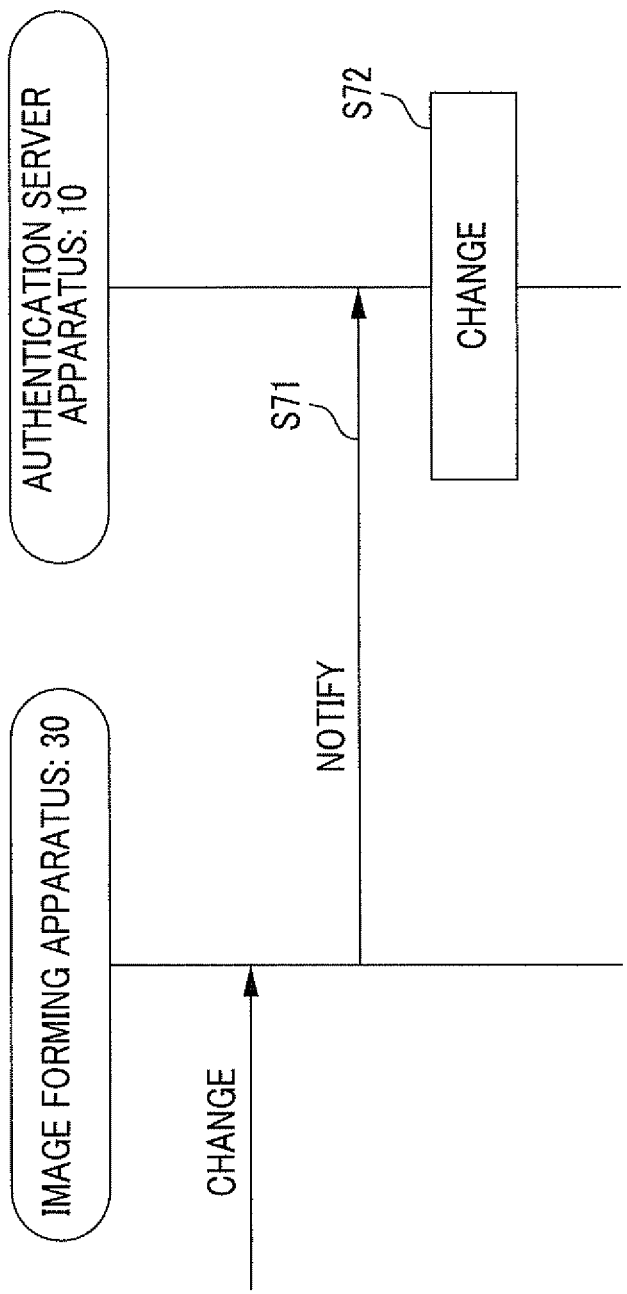
FIG. 21 is a sequence chart illustrating a changing operation of the spooler information according to the modified example 3.

In addition, in the above-described second exemplary embodiment as well, there are cases where spooler information of the image forming apparatus 30 may be changed. In this case, the image forming apparatus 30 may notify the authentication server apparatus 10 of the changed spooler information. FIG. 21 is a sequence chart illustrating a changing operation of spooler information according to the modified example 3. When spooler information of the own apparatus is changed, the image forming apparatus 30 notifies the authentication server apparatus 10 of the changed spooler information (step S71). Specifically, the controller 31 controls the communication unit 32 so as to transmit spooler information before being changed and spooler information after being changed to the authentication server apparatus 10. In other words, in the modified example 3, the controller 31 functions as a third transmission unit.

The authentication server apparatus 10 changes user information 43 stored in the storage unit 14 in response to the notification from the image forming apparatus 30 (step S72). Specifically, when the spooler information before being changed and the spooler information after being changed are received from the image forming apparatus 30, the CPU 11 determines whether or not the received spooler information before being changed is included in the user information 43. If the spooler information before being changed is included in the user information 43, the CPU 11 rewrites the spooler information before being changed, included in the user information 43, to the received spooler information after being changed. In other words, in the modified example 3, the CPU functions as a changing unit. Thereby, the spooler information stored in the authentication server apparatus 10 is changed according to the change in the spooler information of the image forming apparatus 30.

(4) Modified Example 4

In the first exemplary embodiment described above, spooler information may be stored in the storage unit 24 through an operation of the user. In this case, the user inputs a mail address assigned to the client apparatus 20 in the text box 52 of the setting screen 51. The image forming apparatus 30 has a mail function. The image forming apparatus 30 transmits the setting information to the client apparatus 20 by electronic mail in step S13 described above. The user operates the client apparatus 20 so as to store spooler information included in the setting information in the storage unit 24 on the basis of the mail received from the image forming apparatus 30.

(5) Modified Example 5

In the second exemplary embodiment described above, the image forming apparatus 30 may display the setting screen 55 when the number of times to be used by the user reaches a threshold value. The number of times to be used includes the number of authentications or the number of image formations. For example, the controller 31 counts the number of authentications for performing user authentication using a user ID for each user ID input by the user. When user authentication is performed using the user ID "user 001" in the image forming apparatus 30A, the controller 31A increases the number of authentications corresponding to the user ID "user 001" by 1. However, the controller 31 does not count the number of authentications with regard to a user ID correlated with spooler information indicating the own apparatus in the user information 43 stored in the authentication server apparatus 10. The controller 31 stores the counted number of authentications in the storage unit 33. When the number of authentications stored in the storage unit 33 reaches a threshold value (for example, three) by the user authentication in step S32 described above, the controller 31 displays the setting screen 55 on the UI unit 34 even if the user does not perform an operation for instructing the setting screen 55 to be displayed.

(6) Modified Example 6

In the above-described second exemplary embodiment, the authentication server apparatus 10 may collectively perform processes for setting a transmission destination of image data in step S37 at a predefined timing (for example, once every night). In addition, when plural pieces of setting information including the same user ID are received from the image forming apparatus 30 up to a predefined timing, the authentication server apparatus 10 performs the process in step S37 on the basis of the finally received setting information.

(7) Modified Example 7

In the above-described first exemplary embodiment or second exemplary embodiment, the temporary setting button may be displayed on the UI unit 34 of the image forming apparatus 30. The temporary setting button receives an instruction for setting the own apparatus as a storage destination of image data only for a predefined period of time (for example, one day). In the above-described first exemplary embodiment, when the temporary setting button is pressed, setting information is transmitted to the client apparatus 20 in the same manner as step S13 described above. However, the setting information includes time period information indicating the above-described predefined period of time. The client apparatus 20 sets a transmission destination of mage data in the same manner as step S14 described above. However, when another spooler information is set in the storage unit 24 in advance, the CPU 21 stores this spooler information in the storage unit 24 as original spooler information. When the time period information included in the setting information has elapsed, the CPU 21 changes the spooler information stored in the storage unit 24 to original spooler information. Thereby, the spooler information is changed only for the predefined period of time.

In addition, in the above-described second exemplary embodiment, when the temporary setting button is pressed, the setting information is transmitted to the authentication server apparatus 10 in the same manner as step S36 described above. Here, this setting information includes time period information indicating the above-described predefined period of time. The authentication server apparatus 10 sets a transmission destination of image data in the same manner as step S37 described above. However, when spooler information is stored so as to be correlated with a user ID included in the setting information in advance in the user information 43, the CPU 11 stores this spooler information in the storage unit 14 as original spooler information. When the period of time indicated by the time period information included in the setting information has elapsed, the CPU 11 changes the spooler information stored so as to be correlated with the user ID included in the setting information in the user information 43 to original spooler information. Thereby, the spooler information is changed only for the predefined period of time.

(8) Modified Example 8

The setting operation according to the above-described first exemplary embodiment or second exemplary embodiment may be performed not only at the first use but also when spooler information is desired to be changed. For example, there are cases where the image forming apparatus 30 normally used is changed due to exchanging seats, changing residence, or job transfer. In this case, the user may operate the image forming apparatus 30 which is newly used so as to set a transmission destination of image data.

(9) Modified Example 9

The above-described user ID is an example of the user information for identifying a user. The user information is not limited to the user ID. For example, the user information may be a card ID assigned to an IC card of the user, or may be a mail address assigned to the user. In addition, as described above, each person has the IC card, and thus a card ID assigned to the IC card may be used as the user information.

(10) Modified Example 10

The above-described user authentication may be performed without using the IC card. For example, the user may input a user ID of the user by the use of the UI unit 34 of the image forming apparatus 30. In addition, instead of the user ID, biological information such as fingerprints may be used. In this case, a device for reading the biological information is installed in the image forming apparatus 30.

(11) Modified Example 11

A configuration of the image forming system 1 is not limited to the configuration shown in FIG. 1 or 10. For example, the number of the image forming apparatuses 30 may be increased according to the number of users. In addition, the client apparatuses 20 corresponding to the number of users may be provided.

(12) Modified Example 12

The image forming unit 35 may be printer which forms an image by methods other than the electronic photography method. In addition, the image forming unit 35 may be a printer which forms a monochrome image or a color image.

The UI unit 34 has a touch panel but may have a display device such as a liquid crystal display device instead of the touch panel.

(13) Modified Example 13

The program executed by the CPU 11, the CPU 21, or the CPU of the controller 31 may be provided in a state of being recorded on a recording medium such as a magnetic tape, a magnetic disk, a flexible disc, an optical disc, a magneto-optical disc, or a memory, and may be installed in the authentication server apparatus 10, the client apparatus 20, or the image forming apparatus 30. In addition, the program may be downloaded to the authentication server apparatus 10, the client apparatus 20, or the image forming apparatus 30 via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
   an image forming apparatus;
   a transmission apparatus;
   a reception section that is provided in the image forming apparatus and receives a designation of the transmission apparatus;
   a first transmission section that is provided in the image forming apparatus and transmits apparatus information indicating an own apparatus to the transmission apparatus designated in the reception section;
   a first storage unit that is provided in the transmission apparatus and stores the apparatus information transmitted from the first transmission section;
   a second transmission section that is provided in the transmission apparatus and transmits image data to an image forming apparatus indicated by the apparatus information stored in the first storage section;
   an image forming unit that is provided in the image forming apparatus and forms an image corresponding to the image data transmitted from the second transmission section;
   a second storage unit that is provided in the image forming apparatus and stores a communication address assigned to the transmission apparatus designated in the reception section;
   a third transmission section that is provided in the image forming apparatus, and transmits apparatus information after being changed to the communication address stored in the second storage unit when the apparatus information indicating the own apparatus is changed; and
   a changing unit that is provided in the transmission apparatus, and changes the apparatus information stored in the first storage unit to the apparatus information after being changed when the apparatus information after being changed is transmitted from the third transmission section.

2. The image forming system according to claim 1, wherein the first storage unit stores the image data transmitted from the second transmission section, and
   wherein the second transmission section transmits the image data stored in the first storage unit after the apparatus information is stored in the first storage unit.

3. The image forming system according to claim 1, further comprising:
   a plurality of image forming apparatuses,
   wherein the reception section receives a designation of a priority for the own apparatus,
   wherein the first transmission section adds the priority designated in the reception section to apparatus information indicating the own apparatus, and then transmits the apparatus information, and
   wherein the second transmission section transmits the image data to an image forming apparatus indicated by apparatus information which is available and has the highest priority added among image forming apparatuses indicated by apparatus information stored in the first storage unit.

4. The image forming system according to claim 2, further comprising:
   a plurality of image forming apparatuses,
   wherein the reception section receives a designation of a priority for the own apparatus,
   wherein the first transmission section adds the priority designated in the reception section to apparatus information indicating the own apparatus, and then transmits the apparatus information, and
   wherein the second transmission section transmits the image data to an image forming apparatus indicated by apparatus information which is available and has the highest priority added among image forming apparatuses indicated by apparatus information stored in the first storage unit.

5. The image forming system according to claim 2, further comprising:
   a second storage unit that is provided in the image forming apparatus and stores a communication address assigned to the transmission apparatus designated in the reception section;
   a third transmission section that is provided in the image forming apparatus, and transmits apparatus information after being changed to the communication address stored in the second storage unit when the apparatus information indicating the own apparatus is changed; and
   a changing unit that is provided in the transmission apparatus, and changes the apparatus information stored in the first storage unit to the apparatus information after being changed when the apparatus information after being changed is transmitted from the third transmission section.

6. The image forming system according to claim 3, further comprising:
   a second storage unit that is provided in the image forming apparatus and stores a communication address assigned to the transmission apparatus designated in the reception section;
   a third transmission section that is provided in the image forming apparatus, and transmits apparatus information after being changed to the communication address stored in the second storage unit when the apparatus information indicating the own apparatus is changed; and a changing unit that is provided in the transmission apparatus, and changes the apparatus information stored in the first storage unit to the apparatus information after being changed when the apparatus information after being changed is transmitted from the third transmission section.

7. The image forming system according to claim 4, further comprising:

a second storage unit that is provided in the image forming apparatus and stores a communication address assigned to the transmission apparatus designated in the reception section;

a third transmission section that is provided in the image forming apparatus, and transmits apparatus information after being changed to the communication address stored in the second storage unit when the apparatus information indicating the own apparatus is changed; and a changing unit that is provided in the transmission apparatus, and changes the apparatus information stored in the first storage unit to the apparatus information after being changed when the apparatus information after being changed is transmitted from the third transmission section.

8. An image forming system comprising:

an image forming apparatus;

a transmission apparatus;

a management apparatus;

a reception section that is provided in the image forming apparatus and receives an input of user information for identifying a user;

a first transmission section that is provided in the image forming apparatus and transmits the input user information and apparatus information indicating the own apparatus to the management apparatus;

a storage unit that is provided in the management apparatus and stores the user information and the apparatus information transmitted from the first transmission section so as to be correlated with each other;

an acquisition section that is provided in the transmission apparatus and acquires apparatus information which is stored in correlation with previously set user information in the storage unit;

a second transmission section that is provided in the transmission apparatus and transmits image data to an image forming apparatus indicated by the apparatus information acquired by the acquisition section;

an image forming unit that is provided in the image forming apparatus and forms an image corresponding to the image data transmitted from the second transmission section;

a third transmission section that is provided in the image forming apparatus, and transmits apparatus information before being changed and apparatus information after being changed to the management apparatus when the apparatus information indicating the own apparatus is changed; and a changing unit that is provided in the management apparatus, and changes apparatus information before being changed stored in the storage unit to the apparatus information after being changed when the apparatus information before being changed and the apparatus information after being changed are transmitted from the third transmission section.

9. The image forming system according to claim 8, further comprising:

a plurality of image forming apparatuses, wherein the reception section receives a designation of a priority for the own apparatus, wherein the first transmission section adds the priority designated in the reception section to apparatus information indicating the own apparatus, and then transmits the apparatus information, and wherein the second transmission section transmits the image data to an image forming apparatus indicated by apparatus information which is available and has the highest priority added among image forming apparatuses indicated by apparatus information stored in the first storage unit.

10. The image forming system according to claim 9, further comprising:

a third transmission section that is provided in the image forming apparatus, and transmits apparatus information before being changed and apparatus information after being changed to the management apparatus when the apparatus information indicating the own apparatus is changed; and a changing unit that is provided in the management apparatus, and changes apparatus information before being changed stored in the storage unit to the apparatus information after being changed when the apparatus information before being changed and the apparatus information after being changed are transmitted from the third transmission section.

11. An image forming apparatus comprising:

a reception section that receives a designation of a transmission apparatus;

a transmission section that transmits apparatus information indicating an own apparatus to the transmission apparatus designated in the reception section;

an image forming unit that forms an image corresponding to image data when the image data is transmitted to the own apparatus from the transmission apparatus on the basis of the apparatus information transmitted from the transmission section;

a storage unit that stores a communication address assigned to the transmission apparatus designated in the reception section; and a second transmission section that transmits apparatus information after being changed to the communication address stored in the storage unit when the apparatus information indicating the own apparatus is changed.

12. An image forming apparatus comprising:

a reception section that receives an input of user information for identifying a user;

a first transmission section that transmits the input user information and apparatus information indicating an own apparatus to a management apparatus;

an image forming unit that forms an image corresponding to image data when the image data is transmitted to the own apparatus from the transmission apparatus on the basis of the user information and the apparatus information transmitted to the management apparatus;

a storage unit that stores a communication address assigned to the management apparatus designated in the reception section; and a second transmission section that transmits apparatus information after being changed to the communication address stored in the storage unit when the apparatus information indicating the own apparatus is changed.

13. A non-transitory computer readable medium storing a program causing a computer to execute a process, the process comprising:

transmitting apparatus information indicating the own apparatus to a transmission apparatus designated in a reception section when the reception section receives a designation of the transmission apparatus;

causing an image forming unit to form an image corresponding to image data when the image data is transmitted to the own apparatus from the transmission apparatus on the basis of the transmitted apparatus information;

storing in a storage unit a communication address assigned to the transmission apparatus designated in the reception section; and transmitting apparatus information after being changed to the communication address stored in the storage unit when the apparatus information indicating the own apparatus is changed.

14. A non-transitory computer readable medium storing a program causing a computer to execute a process, the process comprising:

transmitting input user information and apparatus information indicating an own apparatus to a management apparatus when a reception section receives an input of the user information for identifying a user;

causing an image forming unit to form an image corresponding to image data when the image data is transmitted to the own apparatus from the transmission apparatus on the basis of the user information and the apparatus information transmitted to the management apparatus;

storing in a storage unit a communication address assigned to the management apparatus designated in the reception section: and transmitting information after being changed to the communication address stored in the storage unit when the apparatus information indicating the own apparatus is changed.

* * * * *